(12) United States Patent
Tang

(10) Patent No.: US 12,647,855 B2
(45) Date of Patent: Jun. 2, 2026

(54) ACL CONFIGURATION METHOD AND APPARATUS

(71) Applicant: HUAWEI TECHNOLOGIES CO., LTD., Shenzhen (CN)

(72) Inventor: Meiling Tang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 305 days.

(21) Appl. No.: 18/352,884

(22) Filed: Jul. 14, 2023

(65) Prior Publication Data

US 2023/0362756 A1 Nov. 9, 2023

Related U.S. Application Data

(63) Continuation of application No. PCT/CN2021/072300, filed on Jan. 15, 2021.

(51) Int. Cl.
*H04W 36/00* (2009.01)
*H04W 48/02* (2009.01)

(52) U.S. Cl.
CPC ....... *H04W 36/0077* (2013.01); *H04W 48/02* (2013.01)

(58) Field of Classification Search
CPC . H04W 36/0061; H04W 24/10; H04W 48/16; H04W 36/0077; H04W 36/0064;
(Continued)

(56) References Cited

U.S. PATENT DOCUMENTS 10,440,639 B1 * 10/2019 Vivanco ............ H04W 36/0061
10,693,678 B2 * 6/2020 Liljenstolpe ............ H04L 45/64
(Continued)

FOREIGN PATENT DOCUMENTS

CN 105325020 A 2/2016
CN 107409439 A 11/2017
(Continued)

OTHER PUBLICATIONS

"3rd Generation Partnership Project; Technical Specification Group Radio Access Network; Evolved Universal Terrestrial Radio Access Network (E-Utran); S1 Application Protocol (S1AP)(Release 16)," 3GPP TS 36.413 V16.4.0, Total 423 pages, 3rd Generation Partnership Project, Valbonne, France (Jan. 2021).
(Continued)

*Primary Examiner* — David Q Nguyen
(74) *Attorney, Agent, or Firm* — Leydig, Voit & Mayer, Ltd.

(57) ABSTRACT

This application discloses an access control list (ACL) configuration method and apparatus. A first base station may include a user plane Internet Protocol (IP) address of the first base station in signaling such as a handover request message, a configuration update message, or a secondary station addition request message, so that a target base station can obtain the user plane IP address of the first base station without performing a transport network layer (TNL) address discovery procedure. Then, an ACL can be configured based on the obtained IP address. Therefore, a case in which a packet sent by the first base station is discarded by a second base station in a base station handover scenario can be effectively avoided, and data transmission reliability can be improved.

13 Claims, 19 Drawing Sheets

First base station

Second base station

Terminal device

(58) Field of Classification Search
 CPC ............... H04W 48/02; H04W 36/023; H04L
 12/2881; H04L 12/1877
 USPC ........................................ 370/328, 329, 330
 See application file for complete search history.

(56) References Cited

U.S. PATENT DOCUMENTS

| | | | | |
|---|---|---|---|---|
| 11,258,840 | B2 * | 2/2022 | Papalini | .................. H04L 65/80 |
| 2014/0064249 | A1 * | 3/2014 | Lee | ................... H04W 36/0033 |
| | | | | 370/331 |
| 2014/0133459 | A1 | 5/2014 | Zhang et al. | |
| 2016/0135072 | A1 * | 5/2016 | Wang | .................... H04W 40/24 |
| | | | | 370/237 |
| 2018/0049098 | A1 | 2/2018 | Ueda | |
| 2021/0377299 | A1 * | 12/2021 | Kaliyamoorthy | ... H04L 63/1416 |

FOREIGN PATENT DOCUMENTS

| | | | |
|---|---|---|---|
| CN | 109788577 A | * | 5/2019 |
| JP | 2016208112 A | | 12/2016 |
| JP | 2017229021 A | | 12/2017 |
| WO | 2019158973 A1 | | 8/2019 |

OTHER PUBLICATIONS

"3rd Generation Partnership Project; Technical Specification Group Radio Access Network; Evolved Universal Terrestrial Radio Access Network(E-UTRAN); X2 application protocol (X2AP)(Release 16)," 3GPP TS 36.423 V16.4.0, Total 500 pages, 3rd Generation Partnership Project, Valbonne, France (Jan. 2021).

"3rd Generation Partnership Project; Technical Specification Group Radio Access Network; Evolved Universal Terrestrial Radio Access (E-UTRA) and NR; Multi-connectivity;Stage 2(Release 16)," 3GPP TS 37.340 V16.4.0, Total 84 pages, 3rd Generation Partnership Project, Valbonne, France (Dec. 2020).

"3rd Generation Partnership Project; Technical Specification Group Radio Access Network; NG-RAN; NG Application Protocol (NGAP)(Release 16)," 3GPP TS 38.413 V16.4.0 Total 470 pages, 3rd Generation Partnership Project, Valbonne, France (Jan. 2021).

"3rd Generation Partnership Project; Technical Specification Group Radio Access Network; NG-RAN; Xn application protocol (XnAP)(Release 16)," 3GPP TS 38.423 V16.4.0, Total 457 pages, 3rd Generation Partnership Project, Valbonne, France (Jan. 2021).

Nokia Siemens Networks, "Refine the definition for X2-proxy," 3GPP TSG-RAN WG3 Meeting #76, Prague, Czech Republic, R3-121415, total 12 pages (May 21-25, 2012).

\* cited by examiner

First base station

Second base station

Terminal device

ACL CONFIGURATION METHOD AND APPARATUS

CROSS-REFERENCE TO RELATED APPLICATIONS

This application is a continuation of International Application No. PCT/CN2021/072300, filed on Jan. 15, 2021, the disclosure of which is hereby incorporated by reference in its entirety.

TECHNICAL FIELD

This application relates to the field of communications technologies, and in particular, to an ACL configuration method and apparatus.

BACKGROUND

For a security purpose in a communications network, a packet filtering function is configured for a base station. That is, an access control list (ACL) is pre-configured on the base station, and the base station performs access control on a received packet through the pre-configured ACL. Specifically, the base station processes only a packet whose source internet protocol (IP) address and destination IP address are in the ACL.

In a scenario in which a terminal device performs base station handover, the terminal device moves from one base station (a source base station) to another base station (a target base station). There is a time difference between handover on a core network side and air interface handover on a terminal device side. Therefore, after the air interface handover on the terminal device side is completed, the core network may still send, to the source base station, data to be sent to the terminal device. Consequently, the source base station needs to forward (Data forwarding) the data to the target base station after receiving the data. In this case, if the packet filtering function is enabled on the target base station, the target base station determines, based on the ACL, whether to process a packet received from the source base station. However, in an existing base station handover scenario, a case in which the target base station discards a packet sent by the source base station often occurs, resulting in poor data transmission reliability.

SUMMARY

This application provides an ACL configuration method and apparatus, to improve data transmission reliability in a base station handover process.

According to a first aspect, an access control list ACL configuration method is provided. The method includes: A second base station receives a handover request message or a configuration update message from a first base station, where the handover request message or the configuration update message carries a user plane internet protocol IP address of the first base station; and the second base station configures an ACL based on the user plane IP address.

In this embodiment of this application, the first base station may carry the user plane IP address of the first base station in the handover request message, so that the second base station can obtain the user plane IP address of the first base station in a handover procedure, and then configure the ACL. In this way, in a process in which a terminal is handed over from the first base station to the second base station, the second base station may not discard a packet sent by the first base station. In addition, when configuration of the first base station is updated (for example, the user plane IP address of the first base station is updated, a neighboring cell is updated, or another update is performed, which is not limited in this application), the first base station may carry the user plane IP address of the first base station in the configuration update message, so that the second base station can obtain the user plane IP address of the first base station. If a terminal device is handed over from the first base station to the second base station subsequently, the second base station may not discard, in a handover process, a packet sent by the first base station. This is because the second base station has pre-configured the ACL based on the user plane IP address of the first base station.

In a possible design, after the second base station configures the ACL based on the user plane IP address, the second base station further receives a packet from the first base station, and the second base station determines whether a source IP address of the packet is in the ACL. If the source IP address of the packet is in the ACL, the second base station processes the packet. If the source IP address of the packet is not in the ACL, the second base station discards the packet.

The user plane IP address of the first base station has been configured in the ACL of the second base station. Therefore, the second base station does not discard the packet. This improves data transmission reliability.

In a possible design, that the second base station receives the handover request message may be that the second base station directly receives the handover request message from the first base station based on an interface between the second base station and the first base station, or may be that the second base station receives the handover request message from the first base station via a core network element.

This embodiment of this application provides two different manners for transmitting the handover request message, which can improve flexibility of the solution.

According to a second aspect, an ACL configuration method is provided, and the method includes:

A first base station generates a handover request message or a configuration update message, where the handover request message or the configuration update message carries a user plane IP address of the first base station; and the first base station sends the handover request message or the configuration update message to a second base station.

In a possible design, the first base station may send the handover request message to the second base station via a core network element.

In a possible design, after the first base station sends the handover request message or the configuration update message to the second base station, the first base station further receives data from a core network; or the first base station further receives data from a terminal device. Further, the first base station generates a packet based on the data, and sends the packet to the second base station. The packet carries a source IP address, and the source IP address is the user plane IP address of the first base station.

In a possible design, the packet may be sent through an interface between the first base station and the second base station.

For beneficial effects of the second aspect and the designs of the second aspect, refer to beneficial effects of the first aspect and the designs of the first aspect. Details are not described herein.

According to a third aspect, an ACL configuration method is provided, and the method includes: A target secondary base station receives a secondary station addition request message from a master base station, where the secondary station addition request message carries a user plane IP address of a source secondary base station; and the target secondary base station configures an ACL based on the user plane IP address.

In this embodiment of this application, in an SN change procedure, the user plane IP address of the S-SN is carried in the secondary station addition request message, so that the T-SN can obtain the user plane IP address of the S-SN without performing a transport network layer (TNL) address discovery procedure. Then, the ACL can be configured based on the obtained S-SN. Therefore, a case in which a packet sent by the S-SN is discarded by the T-SN in an SN handover scenario can be effectively avoided, and data transmission reliability can be improved.

In a possible design, after the target secondary base station configures the ACL based on the user plane IP address, the target secondary base station further receives a packet from the source secondary base station, and the target secondary base station determines whether a source IP address of the packet is in the ACL. If the source IP address of the packet is in the ACL, the target secondary base station processes the packet. If the source IP address of the packet is not in the ACL, the target secondary base station discards the packet.

The user plane IP address of the S-SN has been configured in the ACL of the T-SN. Therefore, the T-SN does not discard the packet. This improves data transmission reliability.

In a possible design, the source secondary base station and the target secondary base station may correspond to different master base stations. Specifically, the source secondary base station corresponds to a source master base station, and the target secondary base station corresponds to a target master base station. Correspondingly, the target secondary base station receives the secondary station addition request message from the target master base station.

In another possible design, both the target secondary base station and the source secondary base station correspond to the master base station, that is, the target secondary base station and the source secondary base station correspond to a same master base station.

This embodiment of this application provides two different manners of transmitting the secondary station addition request message, to improve flexibility of the solution.

According to a fourth aspect, an ACL configuration method is provided, and the method includes: A master base station generates a secondary station addition request message, where the secondary station addition request message carries a user plane IP address of a source secondary base station; and the master base station sends the secondary station addition request message to a target secondary base station.

In a possible design, the source secondary base station and the target secondary base station correspond to different master base stations. Specifically, the source secondary base station corresponds to a source master base station, and the target secondary base station corresponds to a target master base station. Correspondingly, before generating the secondary station addition request message, the target master base station further receives a handover request message from the source master base station. The handover request message carries the user plane IP address of the source secondary base station.

In this embodiment of this application, an ACL may be configured for both the target master base station and the target secondary base station, so that data transmission reliability can be further improved.

In a possible design, the handover request message further carries a user plane IP address of the source master base station. The target master base station further configures an ACL based on the user plane IP address of the source master base station.

In a possible design, both the target secondary base station and the source secondary base station correspond to the master base station, that is, the target secondary base station and the source secondary base station correspond to a same master base station.

For beneficial effects of the fourth aspect and the designs of the fourth aspect, refer to beneficial effects of the third aspect and the designs of the third aspect. Details are not described herein.

According to a fifth aspect, an ACL configuration apparatus is provided. The apparatus is located in a second base station, and may be, for example, the second base station or a chip disposed inside a network device. The apparatus includes modules configured to perform the method according to any one of the first aspect or the possible implementations of the first aspect.

For example, the apparatus may include: a transceiver unit, configured to receive a handover request message or a configuration update message from a first base station, where the handover request message or the configuration update message carries a user plane IP address of the first base station; and a processing unit, configured to configure an ACL based on the user plane IP address.

According to a sixth aspect, an ACL configuration apparatus is provided. The apparatus is located in a first base station, and may be, for example, the first base station or a chip disposed in a network device. The apparatus includes a module configured to perform the method according to any one of the second aspect or the possible implementations of the second aspect.

For example, the apparatus may include: a processing unit, configured to generate a handover request message or a configuration update message, where the handover request message or the configuration update message carries a user plane IP address of the first base station; and a transceiver unit, configured to send the handover request message or the configuration update message to a second base station.

According to a seventh aspect, an ACL configuration apparatus is provided. The apparatus is located in a target secondary base station, and may be, for example, the target secondary base station or a chip disposed in the target secondary base station. The apparatus includes a module configured to perform the method according to any one of the third aspect or the possible implementations of the third aspect.

For example, the apparatus may include: a transceiver unit, configured to receive a secondary station addition request message from a master base station, where the secondary station addition request message carries a user plane IP address of a source secondary base station; and a processing unit, configured to configure an ACL based on the user plane IP address.

According to an eighth aspect, an ACL configuration apparatus is provided. The apparatus is located in a master base station, and may be, for example, the master base station or a chip disposed in the master base station. The apparatus includes a module configured to perform the method according to any one of the fourth aspect or the possible implementations of the fourth aspect.

For example, the apparatus may include: a processing unit, configured to generate a secondary station addition request message, where the secondary station addition request message carries a user plane IP address of a source secondary base station; and a transceiver unit, configured to send the secondary station addition request message to a target secondary base station.

According to a ninth aspect, a communications apparatus is provided, including a processor and a memory. The memory is configured to store computer-executable instructions. The processor is configured to execute the computer-executable instructions stored in the memory, so that the communications apparatus performs the method according to any one of the first aspect, the possible designs of the first aspect, the second aspect, the possible designs of the second aspect, the third aspect, the possible designs of the third aspect, the fourth aspect, or the possible designs of the fourth aspect.

According to a tenth aspect, a communications apparatus is provided, including a processor and an interface circuit. The interface circuit is configured to receive a code instruction and transmit the code instruction to the processor. The processor runs the code instruction to perform the method according to any one of the first aspect, the possible designs of the first aspect, the second aspect, the possible designs of the second aspect, the third aspect, the possible designs of the third aspect, the fourth aspect, or the possible designs of the fourth aspect.

According to an eleventh aspect, a computer-readable storage medium is provided. The computer-readable storage medium is configured to store instructions, and when the instructions are executed, the method according to any one of the first aspect, the possible designs of the first aspect, the second aspect, the possible designs of the second aspect, the third aspect, the possible designs of the third aspect, the fourth aspect, or the possible designs of the fourth aspect is implemented.

According to a twelfth aspect, a chip is provided. The chip is coupled to a memory, and is configured to read and execute program instructions stored in the memory, to implement the method according to any one of the first aspect, the possible designs of the first aspect, the second aspect, the possible designs of the second aspect, the third aspect, the possible designs of the third aspect, the fourth aspect, or the possible designs of the fourth aspect.

According to a thirteenth aspect, a computer program product including instructions is provided. The computer program product stores the instructions, and when the instructions are run on a computer, the computer is enabled to perform the method according to any one of the first aspect, the possible designs of the first aspect, the second aspect, the possible designs of the second aspect, the third aspect, the possible designs of the third aspect, the fourth aspect, or the possible designs of the fourth aspect.

According to a fourteenth aspect, a communications system is provided, including a first base station and a second base station. The second base station is configured to perform the method according to any one of the first aspect or the possible designs of the first aspect, and the first base station is configured to perform the method according to any one of the second aspect or the possible designs of the second aspect.

According to a fifteenth aspect, a communications system is provided, including a target secondary base station and a master base station. The target secondary base station is configured to perform the method in any one of the third aspect or the possible designs of the third aspect, and the master base station is configured to perform the method in any one of the fourth aspect or the possible designs of the fourth aspect.

DESCRIPTION OF EMBODIMENTS

The technical solutions in embodiments of this application may be applicable to a 5th generation (5G) system, and may also be applicable to another wireless communications system, for example, a long term evolution (LTE) system, a global system for mobile communications (GSM), a universal mobile telecommunications system (UMTS), a code division multiple access (CDMA) system, and a new network device system.

Figure 1:
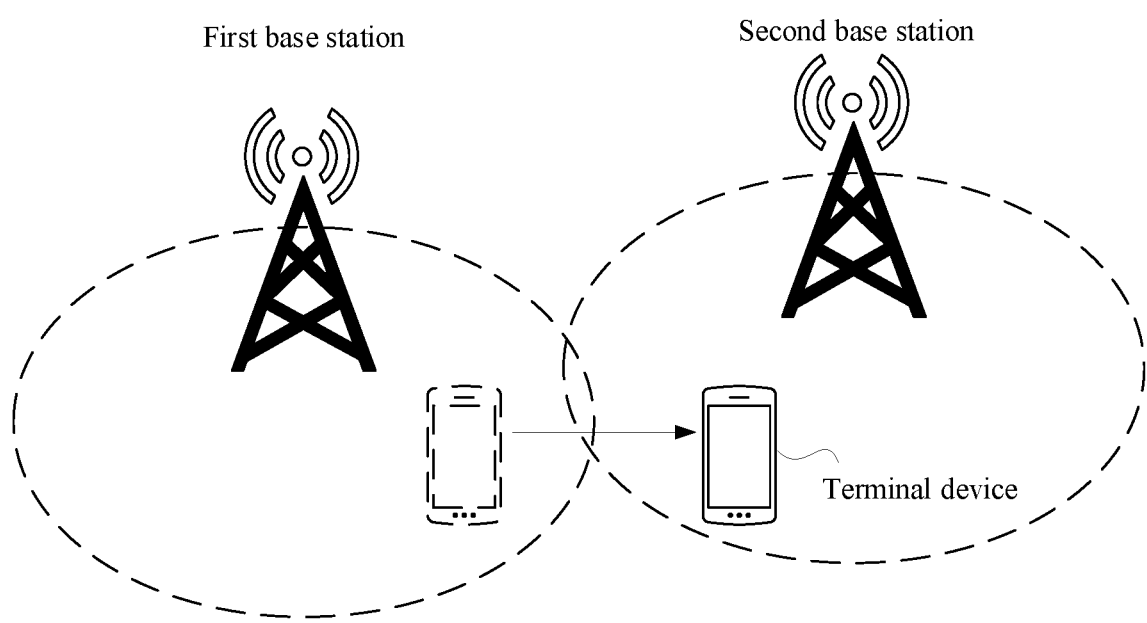
FIG. 1 is a schematic diagram of a network architecture to which this application is applicable.

To facilitate understanding of embodiments of this application, an application scenario used in embodiments of this application is described by using a network architecture shown in FIG. 1. The network architecture may be applied to the foregoing various communications systems.

As shown in FIG. 1, a communications system includes a first base station, a second base station, and a terminal device. When the terminal device is located in a coverage area of the first base station, the terminal device can be connected to and communicate with the first base station. When the terminal device is located in a coverage area of the second base station, the terminal device can be connected to and communicate with the second base station. When the terminal device moves from the coverage area of the first base station to the coverage area of the second base station, the first base station is a source base station for base station handover of the terminal device, and the second base station is a target base station for base station handover of the terminal device. When the terminal device moves from the coverage area of the second base station to the coverage area of the first base station, the second base station is a source base station for base station handover of the terminal device, and the first base station is a target base station for base station handover of the terminal device. For example, in FIG. 1, an example in which the first base station is a source base station and the second base station is a target base station is used.

In this specification, the terminal device, also referred to as a terminal, may include a device that provides a user with voice and/or data connectivity, for example, may include a handheld device having a wireless connection function, or a processing device connected to a wireless modem. The terminal device may communicate with a core network through a radio access network (RAN), and exchange a voice and/or data with the RAN. The terminal device may include a user equipment (UE), a wireless terminal device, a mobile terminal device, a device-to-device (D2D) communications terminal device, a V2X terminal device, a machine-to-machine/machine-type communications (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, or a portable, pocket-sized, handheld, or computer built-in mobile apparatus. For example, the terminal device may be a device such as a personal communications service (PCS) phone, a cordless telephone, a session initiation protocol (SIP) phone, a wireless local loop (WLL) station, or a personal digital assistant (PDA). The terminal device further includes a limited device, for example, a device with low power consumption, a device with a limited storage capacity, or a device with a limited computing capability. For example, the terminal device includes an information sensing device such as a barcode, radio frequency identification (RFID), a sensor, a global positioning system (GPS), or a laser scanner.

By way of example, and not limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn on a body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices dedicated to only one type of application function and need to collaboratively work with other devices such as smartphones, for example, various smart bands, smart helmets, or smart jewelry for monitoring physical signs.

If the various terminal devices described above are located in a vehicle (for example, placed in the vehicle or installed in the vehicle), the terminal devices may be all considered as vehicle-mounted terminal devices. For example, the vehicle-mounted terminal devices are also referred to as on-board units (OBUs).

In this specification, the base station may be a device that communicates with a wireless terminal device over an air interface in an access network by using one or more cells. The base station may be configured to mutually convert a received over-the-air frame and an internet protocol (IP) packet, and serve as a router between the terminal device and a remaining part of the access network. The remaining part of the access network may include an IP network. The base station may be an evolved NodeB (eNB or eNodeB) in a long term evolution (LTE) system or a long term evolution advanced (LTE-A) system; may be a next generation NodeB (gNB), a next generation evolved NodeB (ng-eNB), or an enhanced next generation NodeB (en-gNB) in a new radio (NR) system of a 5th generation (5G) mobile communications technology; may include a central unit (CU) and a distributed unit (DU) in a cloud radio access network (cloud RAN) system; or may further be a relay device. This is not limited in embodiments of this application.

In embodiments of this application, the source base station (the first base station shown in FIG. 1) and the target base station (the second base station shown in FIG. 1) may be base stations of a same type (for example, both are base stations in an LTE system, or both are base stations in a 5G system), or may be different (for example, the source base station is a base station in an LTE system, and the target base station is a base station in a 5G system; or the source base station is a base station in a 5G system, and the target base station is a base station in an LTE system). This is not limited in this application.

Due to mobility of the terminal device, the terminal device moves from the coverage area of the source base station to the coverage area of the target base station (a dashed arrow in FIG. 1 indicates a movement direction), and the terminal device triggers an inter-base-station handover procedure. The inter-base-station handover procedure includes the following steps: First, the terminal device performs air interface handover, and hands over an air interface connected to the terminal device from an air interface provided by the source base station to an air interface provided by the target base station; then, the source base station reports handover information to a core network device for handover; and the core network device performs core network-related handover after receiving the handover information. There is a time difference between handover on a core network side and air interface handover on a terminal device side (the handover on the core network side is later than the air interface handover on the terminal device side). Therefore, after the terminal device hands over the air interface to the target base station, the core network may probably send, to the source base station, data to be sent to the terminal device. In this case, the source base station needs to forward (Data forwarding) the data to the target base station after receiving the data, and then the target base station sends the data to the terminal device.

A forged packet may exist in a communications network. For a security purpose, a packet filtering function is configured for a base station. That is, an ACL is pre-configured on the base station, so that the base station performs access control on a received packet through the ACL. Specifically, an IP address is configured in the ACL. After receiving a packet, the base station needs to determine that both a source IP address and a destination IP address of the packet are in the ACL before continuing to process the packet. Otherwise, the base station discards the packet.

However, in a base station handover scenario, as shown in FIG. 1, if a packet filtering function of the target base station is enabled, the target base station needs to obtain a user plane IP address of the source base station in advance and pre-configure the ACL based on the IP address, so that the target base station does not discard a packet sent by the source base station.

If a control plane transmission link of an X2/Xn interface between the source base station and target base station is not established, the source base station and the target base station can obtain IP addresses (including a control plane IP address and a user plane IP address) of peer ends by using a TNL address discovery procedure, to establish X2/Xn transmission links (including a control plane transmission link and a user plane transmission link) and configure IP addresses of peer base stations in ACLs of the source base station and target base station.

Figure 2:
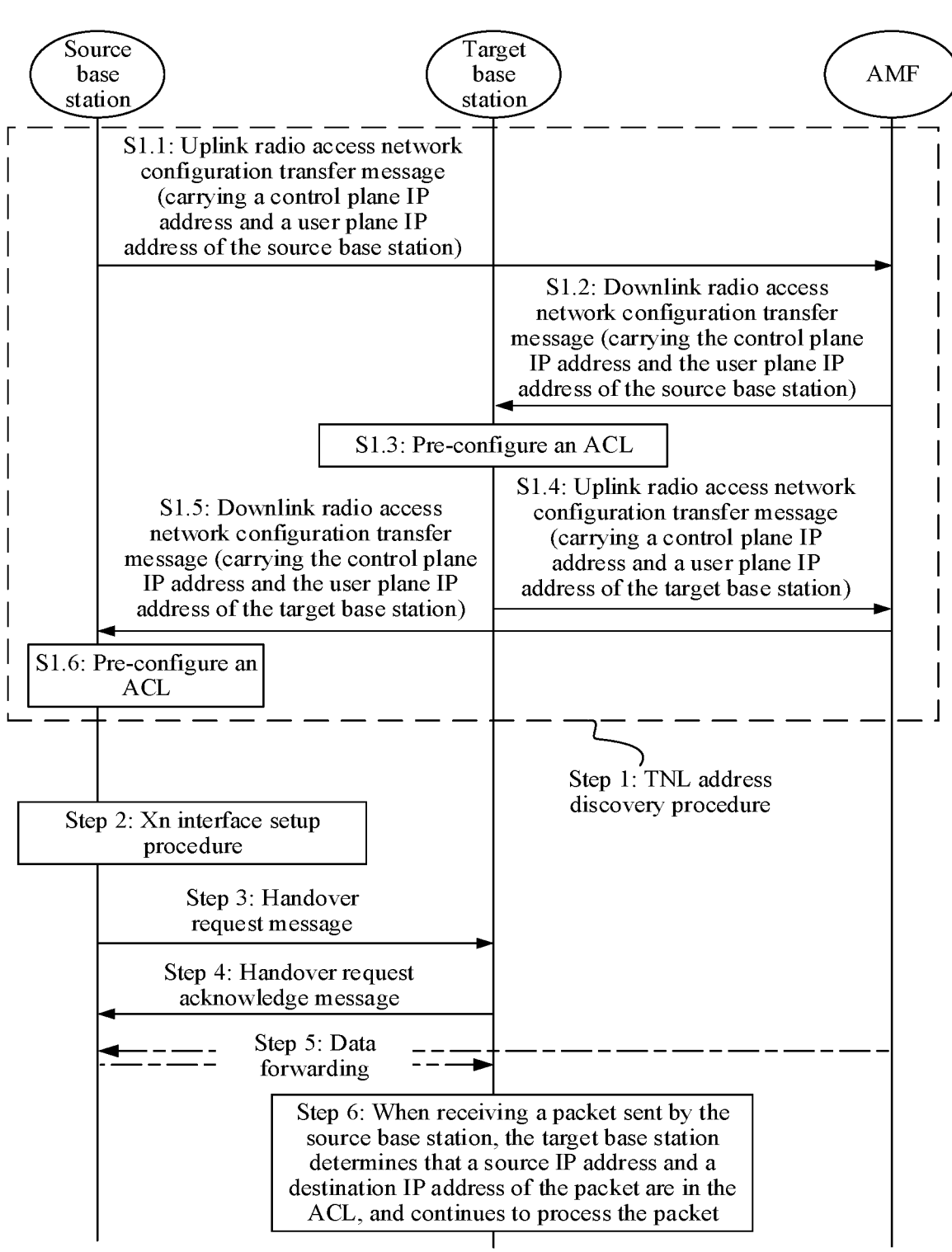
FIG. 2 is a schematic diagram of a TNL address discovery procedure and an Xn interface handover procedure.

For example, FIG. 2 is a schematic diagram of a TNL address discovery procedure and an Xn interface handover procedure.

Step 1: Perform a TNL address discovery procedure.

Before the Xn interface handover procedure is performed, a source base station and a target base station first perform the TNL address discovery procedure to obtain IP addresses of peer ends and pre-configure ACLs. Specifically, the TNL address discovery procedure includes S1.1 to S1.6.

S1.1: The source base station (for example, a next-generation radio access network (NG-RAN) node (node) 1) sends an uplink RAN configuration transfer message to a core network device (an access and mobility management function (AMF) is used as an example in FIG. 2). The message carries a control plane IP address and a user plane IP address of the source base station.

S1.2: The AMF sends a downlink RAN configuration transfer message to the target base station (for example, an NG-RAN node 2). The message carries the control plane IP address and the user plane IP address of the source base station.

S1.3: After receiving the downlink RAN configuration transfer message, the target base station uses the control plane IP address and the user plane IP address of the source base station to create a transmission link of an Xn interface, and pre-configures an ACL of the target base station.

S1.4: The target base station sends an uplink RAN configuration transfer message to the core network device. The message carries a control plane IP address and a user plane IP address of the target base station.

S1.5: The core network device sends a downlink RAN configuration transfer message to the source base station. The message carries the control plane IP address and the user plane IP address of the target base station.

S1.6: After receiving the downlink RAN configuration transfer message, the source base station uses the control plane IP address and the user plane IP address of the target base station to create an Xn transmission link, and pre-configures an ACL of the source base station.

Step 2: Perform an Xn interface setup procedure.

Step 3: The source base station sends a handover request message to the target base station.

Step 4: The target base station sends a handover request acknowledge message to the source base station.

Step 5: After an air interface connection of a terminal device is handed over from the source base station to the target base station, the core network still sends, to the source base station before core network handover is completed, data to be sent to the terminal device. After receiving the data, the source base station encapsulates the data into a packet and forwards the packet to the target base station.

Step 6: After receiving the packet forwarded by the source base station, the target base station determines that a source IP address (that is, the IP address of the source base station) and a destination IP address (that is, the IP address of the target base station) of the packet are in the ACL, and continues to process the packet.

As shown in FIG. 2, when a control plane transmission link between the source base station and the target base station is not established, the source base station and the target base station pre-configure ACLs by using the TNL address discovery procedure.

However, in some scenarios, the source base station and the target base station do not support the TNL procedure, and the target base station cannot pre-configure the user plane IP address of the source base station in the ACL. Therefore, in a process of handing over the terminal device from the source base station to the target base station, the target base station discards a packet sent by the source base station.

The following provides two possible scenario examples:

Example 1: Multi-Operator Sharing Scenario

Figure 3:
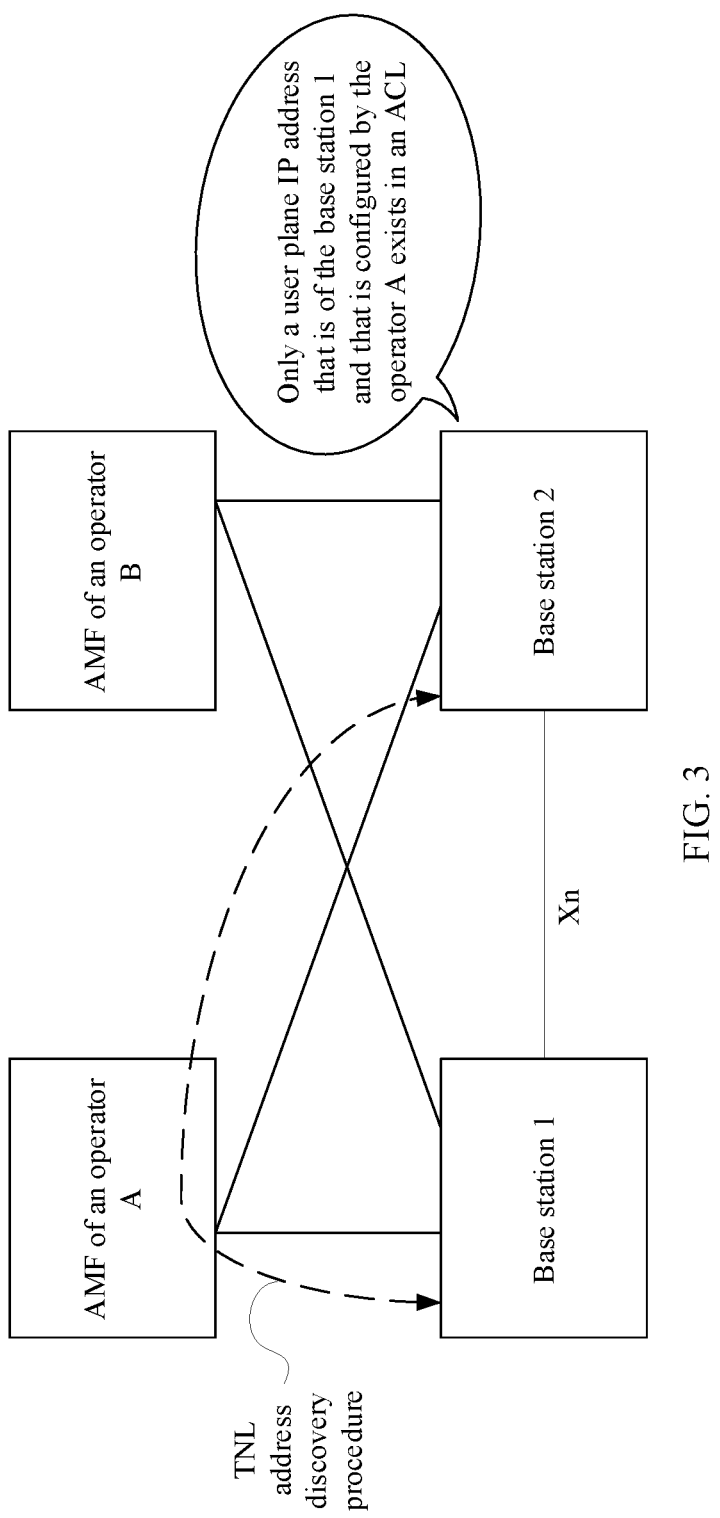
FIG. 3 is a schematic diagram of a multi-operator sharing scenario.

As shown in FIG. 3, an operator A is first introduced to a base station 1 and a base station 2. When a terminal device served by the operator A performs inter-base-station handover, the base station 1 and the base station 2 are triggered to perform a TNL address discovery procedure over an Xn interface, create Xn transmission links, and pre-configure an ACL corresponding to the operator A. The Xn interface works normally, and data forwarding is normal. Then, an operator B is introduced. For a security purpose, the operator A and the operator B do not share user plane IP addresses but may share control plane IP addresses. Therefore, when a terminal device served by the operator B performs Xn-based inter-base-station handover, an Xn interface control plane transmission link of the operator B (that is, an Xn interface control plane transmission link of the operator A) works normally. Therefore, when the terminal device served by the operator B performs the inter-base-station handover, the base station 1 and the base station 2 are not triggered to perform a TNL address discovery procedure over the Xn interface. Consequently, the base station 2 cannot obtain a user plane IP address configured by the operator B for the base station 1, and cannot automatically pre-configure an ACL corresponding to the operator B. In a base station handover scenario, when the base station 1 forwards a packet corresponding to the operator B to the base station 2, the base station 2 discards the packet, and data transmission fails.

Example 2: Secondary Node Change Scenario

First, an LTE/NR dual connectivity scenario is briefly described. In a non-standalone (NSA) network based on an evolved packet core (EPC), a terminal device with an NSA dual connectivity capability is connected to both an LTE base station and an NR base station. The terminal device performs transmission by using radio resources of the two base stations. Data of the terminal device can be split and transmitted between the two base stations. After carriers on an eNodeB side and a gNodeB side are separately aggregated, dual connectivity is performed. One of the two base stations connected to the terminal device is a master base station (or referred to as a master node, a master station, or the like), and the other is a secondary base station (or referred to as a secondary node, a secondary station, or the like).

In a secondary node (SN) change procedure in the non-standalone (NSA) network, signaling between a source secondary node (S-SN) and a target secondary node (T-SN) is forwarded by the master node (MN). There is no X2 interface between the S-SN and the T-SN. Therefore, there is no TNL address discovery, and the T-SN cannot obtain a user plane IP address of the S-SN. However, when the terminal device is handed over between the S-SN and the T-SN, the S-SN also forwards data to the T-SN. However, the T-SN cannot obtain the user plane IP address of the S-SN, and cannot pre-configure the user plane IP address of the S-SN in an ACL. Consequently, the data forwarded by the S-SN is discarded by the T-SN, and data transmission fails.

It should be understood that the secondary node in this specification may also be referred to as a secondary base station (SgNB), a secondary station, or the like, and the master node may also be referred to as a master base station (MgNB), a master station, or the like.

Figure 4:
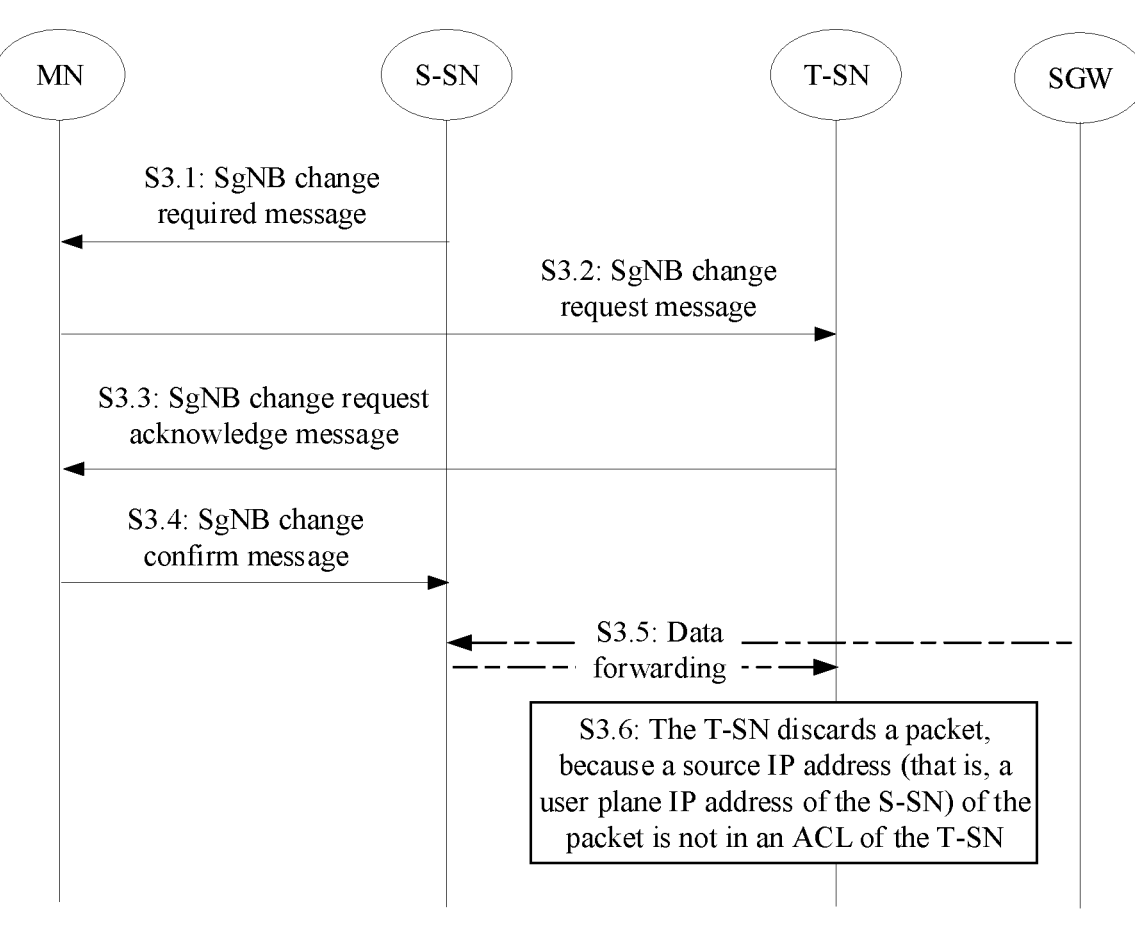
FIG. 4 is a flowchart of a secondary node change triggered by an SN.

FIG. 4 shows a secondary node change procedure triggered by an SN. The procedure includes the following steps.

S3.1: An S-SN sends an SgNB change required message to an MN.

S3.2: The MN sends an SgNB change request message to a T-SN.

S3.3: The T-SN sends an SgNB change request acknowledge message to the MN.

S3.4: The MN sends an SgNB change confirm message to the S-SN, and secondary station change confirmation is completed.

S3.5: After an air interface connection of a terminal device is handed over from the S-SN to the T-SN, when handover of a serving gateway (SGW) is not completed, the SGW still sends, to the S-SN, data to be sent to the terminal device, and the S-SN encapsulates the data into a packet and forwards the packet to the T-SN after receiving the data.

S3.6: The T-SN discards the packet forwarded by the S-SN to the T-SN, because a source IP address (that is, a user plane IP address of the S-SN) of the packet is not in an ACL of the T-SN.

Example 3: Base Station User Plane IP Address Updating Scenario

Using FIG. 1 as an example, a first base station and a second base station exchange IP addresses and pre-configure ACLs based on a TNL address discovery procedure. After a period of time, a user plane IP address of the first base station is updated. In this case, a terminal device triggers a base station handover procedure. The terminal device is handed over from the first base station to the second base station. The second base station does not know that the user plane IP address of the first base station is updated, and the ACL of the second base station still stores only a user plane IP address before the update of the first base station. In this case, if a source base station sends a packet to a target base station by using an updated user plane IP address, the target base station considers that the IP address in the packet does not match a packet in the ACL, in this way, the packet sent by the source base station is discarded.

It can be learned from the foregoing description that in some data forwarding scenarios, the target base station cannot perform ACL pre-configuration by using a TNL procedure. Consequently, a packet sent by the source base station is discarded by the target base station, and data transmission reliability is poor.

To resolve the foregoing technical problem, embodiments of this application provide an ACL configuration method and apparatus. A source base station may include a user plane IP address of the source base station in signaling such as a handover request message, a configuration update message, or a secondary station addition request message, so that a target base station can obtain the user plane IP address of the source base station without performing a TNL address discovery procedure. Then, an ACL can be configured based on the obtained IP address. Therefore, a case in which a packet sent by the source base station is discarded by the target base station in a base station handover scenario can be effectively avoided, and data transmission reliability can be improved.

To make objectives, technical solutions, and advantages of embodiments of this application clearer, the following further describes technical solutions of embodiments of this application in detail with reference to the accompanying drawings.

It should be noted that the terms "system" and "network" may be used interchangeably in embodiments of this application, and "at least one" refers to one or more, and "a plurality of" refers to two or more. The term "and/or" is an association relationship for describing associated objects, and may indicate that three relationships may exist. For example, A and/or B may indicate the following cases: Only A exists, both A and B exist, and only B exits, where A and B may be singular or plural. The character "/" usually indicates an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c.

In addition, unless otherwise stated, ordinal numbers such as "first" and "second" in embodiments of this application are for distinguishing between a plurality of objects, but are not intended to limit an order, a time sequence, priorities, or importance of the plurality of objects. For example, a first priority criterion and a second priority criterion are merely used to distinguish between different criteria, but do not indicate different content, priorities, importance, or the like of the two criteria.

In addition, the terms "include" and "have" in embodiments, claims, and accompanying drawings of this application are not exclusive. For example, a process, a method, a system, a product, or a device including a series of steps or modules is not limited to the listed steps or modules, and may further include steps or modules that are not listed.

With reference to FIG. 5 to FIG. 9, the following describes in detail an ACL configuration solution in an X2/Xn-based inter-base-station handover scenario.

Figure 5:
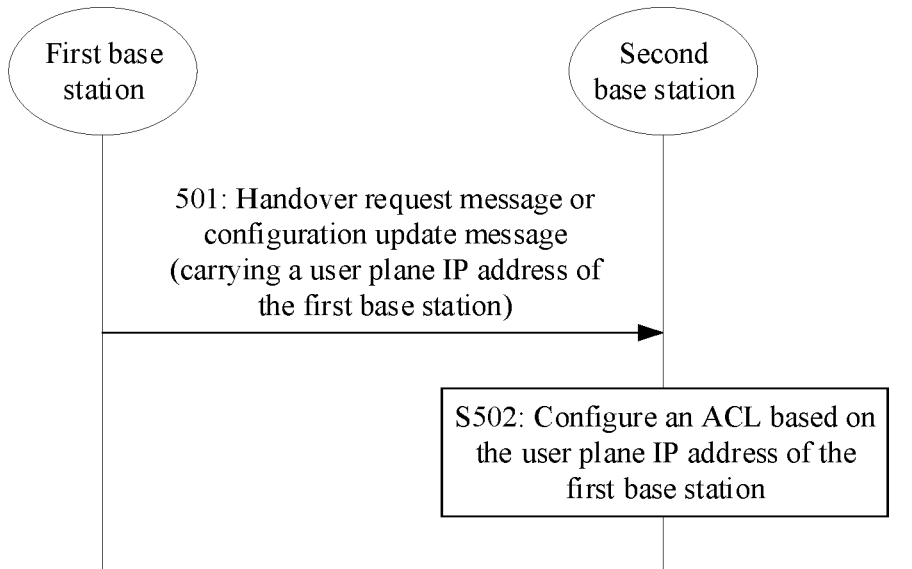
FIG. 5 is a schematic flowchart of an ACL configuration method according to an embodiment of this application.

FIG. 5 shows an ACL configuration method provided in an embodiment of this application. The method includes the following steps.

S501: A first base station sends a handover request message or a configuration update message to a second base station, and the second base station sends and receives the handover request message or the configuration update message from the first base station. The handover request message or the configuration update message carries a user plane IP address of the first base station.

There is an interface for direct communication between the first base station and the second base station, for example, an X2 interface or an Xn interface. This is not specifically limited in this application. When the interface between the first base station and the second base station is the X2 interface, both the first base station and the second base station are evolved NodeBs (eNBs or eNodeBs) in a long term evolution (LTE) system or a long term evolution advanced (LTE-A) system. When the interface between the first base station and the second base station is the Xn interface, both the first base station and the second base station are next generation NodeBs (gNB), next generation evolved NodeBs (ng-eNB), or enhanced next generation NodeBs en-gNBs (en-gNB) in a new radio (NR) system of a 5th generation (5G) mobile communications technology.

S502: The second base station configures an ACL based on the user plane IP address of the first base station.

Specifically, if an ACL has been configured on the second base station, the user plane IP address of the first base station is added to the ACL as a source IP address, and an IP address of the second base station may further be added as a destination IP address. If no ACL has been configured on the second base station, an ACL is created. The user plane IP address of the first base station is added to the created ACL as a source IP address, and an IP address of the second base station may further be added as a destination IP address.

In this embodiment of this application, the first base station may carry the user plane IP address of the first base station in the handover request message, so that the second base station can obtain the user plane IP address of the first base station in a handover procedure, and then configure the ACL. In this way, in a process in which a terminal is handed over from the first base station to the second base station, the second base station may not discard a packet sent by the first base station.

It may be understood that when a terminal device is handed over between base stations, that is, when the first base station sends the handover request message to the second base station, the first base station may also be referred to as a source base station, and the second base station may also be referred to as a target base station.

In this embodiment of this application, when configuration of the first base station is updated (for example, the user plane IP address of the first base station is updated, a neighboring cell is updated, or another update is performed, which is not limited in this application), the first base station may carry the user plane IP address of the first base station in the configuration update message (if it is triggered by an update of the user plane IP address of the first base station, the configuration update message carries an updated user plane IP address of the first base station), so that the second base station can obtain the user plane IP address of the first base station. In this way, if the terminal device is handed over from the first base station to the second base station subsequently, the second base station may not discard, in a handover process, a packet sent by the first base station. This is because the second base station has pre-configured the ACL based on the user plane IP address of the first base station.

Optionally, after the first base station sends the handover request message or the configuration update message to the second base station, or after the first base station sends a change required message to a core network element, the first base station further receives data from a core network, where the data is to be sent to the terminal device. Alternatively, the first base station further receives data from the terminal device, where the data is to be sent to the core network. In this case, because the terminal device is handed over to the second base station, the first base station generates a packet based on the received data, adds a source IP address and a destination IP address to the packet, and then sends the packet to the second base station. The source IP address is the user plane IP address of the first base station, and the destination IP address is a user plane IP address of the second base station. Correspondingly, after receiving the packet sent by the first base station, the second base station determines whether the source IP address of the packet is in the ACL. If the source IP address of the packet is in the ACL, the second base station processes the packet. If the source IP address of the packet is not in the ACL, the second base station discards the packet.

The user plane IP address of the first base station has been configured in the ACL of the second base station. Therefore, the second base station does not discard the packet. This improves data transmission reliability.

Optionally, in Step S501, that the first base station sends the handover request message to the second base station includes but is not limited to the following two manners.

Manner 1: The first base station sends the handover request message to the second base station through the interface between the first base station and the second base station.

For example, both the first base station and the second base station are base stations in the LTE system, and the first base station sends the handover request message to the second base station through the X2 interface. Alternatively, for example, both the first base station and the second base station are base stations in the 5G system, and the first base station sends the handover request message to the second base station through the Xn interface.

Manner 2: The first base station sends the handover request message to the second base station via a core network element.

For example, the first base station generates a change required message, and the change required message carries the user plane IP address of the first base station. The first base station sends the change required message to the core network element. After receiving the change required message, the core network element generates a handover request message, and the handover request message carries the user plane IP address of the first base station. The core network element sends the handover request message to the second base station.

It should be understood that the core network element may be any network element that can communicate with the first base station and the second base station, for example, an AMF. This is not limited in this embodiment of this application.

It should be noted that, in an inter-base-station handover process, a prerequisite for the first base station to carry the user plane IP address of the first base station in the change required message is that there is a direct forwarding path between the first base station and the second base station. In other words, when the first base station subsequently sends a packet (data from a core network or data from a device is encapsulated in the packet) to the second base station, the packet is directly sent through the interface between the first base station and the second base station.

In this way, for the second base station when the first base station does not directly send a packet to the second base station (for example, there is no direct forwarding path between the first base station and the second base station, and the packet needs to be forwarded by the core network to reach the second base station), the second base station does not perform unnecessary ACL configuration. This improves utilization of a system resource.

To better understand the technical solution shown in FIG. 5, the following further provides several complete embodiments with reference to several specific inter-base-station handover scenarios.

Embodiment 1

Figure 6:
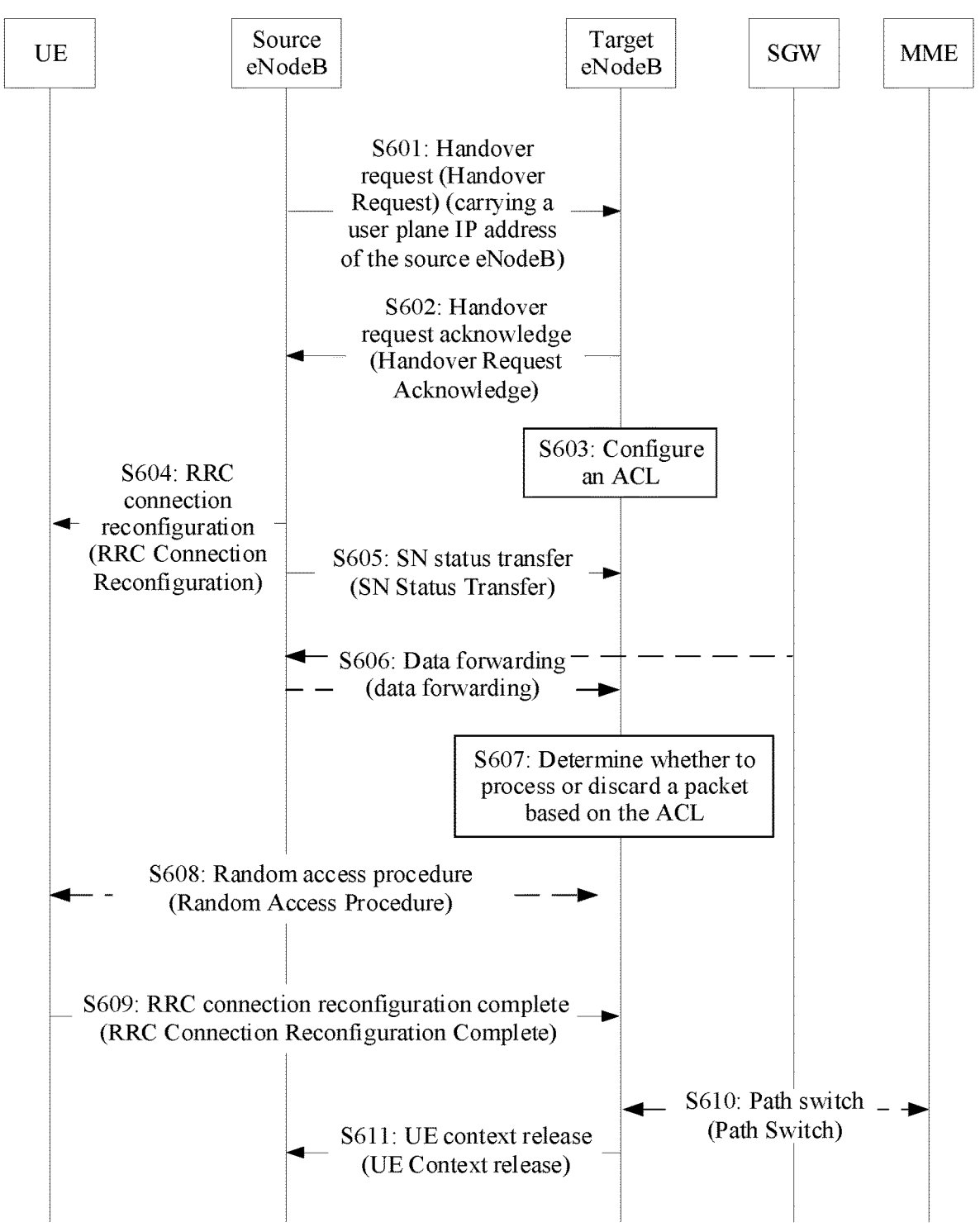
FIG. 6 is a schematic flowchart of base station handover in an X2-based inter-base-station handover scenario.

As shown in FIG. 6, an X2-based inter-base-station handover scenario (that is, an interface between a source base station and a target base station is an X2 interface) is used as an example. The solution includes the following steps.

S601: When UE is handed over from a source eNodeB to a target eNodeB, the source eNodeB sends a handover request message to the target eNodeB, where the handover request message carries an X2 interface user plane IP address of the source eNodeB.

S602: The target eNodeB sends a handover request acknowledge message to the source eNodeB.

S603: The target eNodeB configures an ACL based on the user plane IP address, carried in the handover request message, of the source eNodeB (that is, a source node of data forwarding) and a user plane IP address of the target eNodeB (the target eNodeB is a destination node of data forwarding).

It may be understood that, in FIG. 6, that the target eNodeB starts to configure the ACL after the target eNodeB sends the handover request acknowledge message to the source eNodeB is used as an example. Actually, the ACL may be configured earlier or later. This is not limited in this application.

S604: The source eNodeB sends an RRC connection reconfiguration message to the UE.

S605: The source eNodeB sends an SN status transfer message to the target eNodeB.

S606: The source eNodeB forwards data from a core network or data from a terminal device to the target eNodeB, where the data is specifically sent to the target eNodeB in a form of a packet. The packet carries a source IP address (that is, the user plane IP address of the source eNodeB) and a destination IP address (that is, the user plane IP address of the target eNodeB).

S607: The target eNodeB determines, based on the configured ACL, whether the source IP address (that is, the user plane IP address of the source eNodeB) and the destination IP address (that is, the user plane IP address of the target eNodeB) carried in the packet are in the ACL. If the source IP address and the destination IP address carried in the packet are in the ACL, the target eNodeB continues to process the packet. If the source IP address and the destination IP address carried in the packet are not in the ACL, the target eNodeB discards the packet.

It should be understood that, the target eNodeB has added the user plane IP address of the source eNodeB and the user plane IP address of the target eNodeB to the ACL in S603. Therefore, the target eNodeB determines that the ACL includes the source IP address and the destination IP address of the packet, and does not discard the packet, but continues to process the packet.

S608: The UE and the target eNodeB perform a random access procedure.

S609: The UE sends an RRC connection reconfiguration complete message.

S610: The target eNodeB and a mobility management entity (MME) perform a path switch (Path Switch) procedure.

S611: The target eNodeB sends a UE context release message to the source eNodeB.

According to S601 to S611, the target eNodeB discovers the user plane IP address of the source eNodeB in a base station handover process and then configures the ACL.

It should be noted that, the source eNodeB may not carry the user plane IP address of the source eNodeB in the foregoing inter-base-station handover process, but notify the target eNodeB of the X2 interface user plane IP address of the source eNodeB by using an evolved NodeB configuration update (eNB Configuration Update) message of the X2 interface of the source eNodeB. The target eNodeB may pre-configure an ACL based on the user plane IP address. When the handover process is performed, the target base station may perform access control on a received packet based on the pre-configured ACL. In this case, the handover procedure is different only in that the handover request message in S601 may not carry the X2 interface user plane IP address of the source eNodeB, and the step (S603) of configuring the ACL may be performed at any moment before data forwarding (S606), for example, before S601. This is not specifically limited in this application.

It should be understood that the eNB configuration update message may be triggered when configuration of the source eNodeB is updated, for example, the user plane IP address of the source eNodeB changes, or a neighboring cell changes. This is not limited in this application. In any scenario in which a configuration update message needs to be sent, a user plane IP address of a sender (for example, the source eNodeB) may be carried in the message.

In Embodiment 1, when a packet filtering function is enabled, the target eNodeB obtains an IP address of a data forwarding source through X2 signaling, and then automatically pre-configures the ACL. There is no need to manually configure the ACL. Therefore, data transmission reliability can be improved.

Embodiment 2

Figure 7:
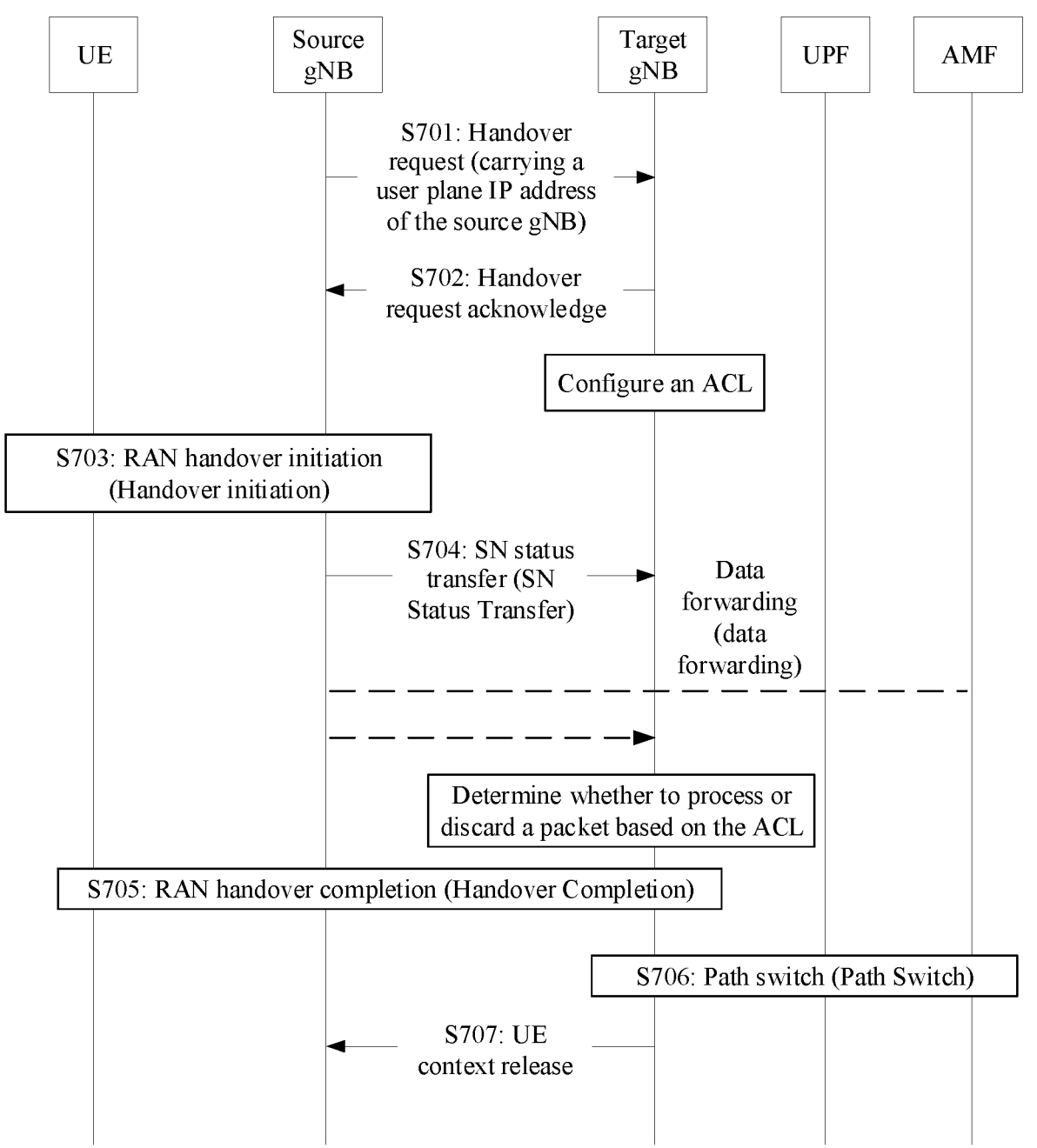
FIG. 7 is a schematic flowchart of base station handover in an Xn-based inter-base-station handover scenario.

As shown in FIG. 7, an Xn-based inter-base-station handover scenario (that is, an interface between a source base station and a target base station is an Xn interface) is used as an example. The solution includes the following steps.

S701: A source gNB sends a handover request message to a target gNB, where the message carries a user plane IP address of the source gNB.

S702: The target gNB sends a handover request acknowledge message to the source gNB.

It may be understood that after receiving the handover request message sent by the source gNB, the target gNB configures an ACL based on the user plane IP address of the source gNB. In FIG. 7, that the target gNB starts to configure the ACL after the target gNB sends the handover request acknowledge message to the source gNB is used as an example. Actually, the ACL may be configured earlier or later. This is not limited in this application.

S703: A UE and the source gNB perform a RAN handover initiation procedure.

S704: The source gNB sends an SN status transfer message to the target gNB.

As shown in FIG. 7, if the target gNB receives a packet sent by the source gNB, the target gNB determines whether both a source IP address and a destination IP address of the packet are in the ACL. If both the source IP address and the destination IP address of the packet are in the ACL, the target gNB continues to process the packet. If both the source IP address and the destination IP address of the packet are not in the ACL, the target gNB discards the packet.

S705: The UE and the source gNB perform a RAN handover completion procedure.

S706: The target gNB and an AMF perform a path switch procedure.

S707: The target gNB sends a UE context release message to the source gNB, so that the source gNB releases a context of the UE.

It should be noted that, the source gNB may not carry the user plane IP address of the source gNB in the foregoing inter-base-station handover process, but notify the target gNB of the Xn interface user plane IP address of the source gNB by using a next-generation radio access network node configuration update (NG-RAN Node Configuration Update) message of the Xn interface of the source gNB. The target gNB may pre-configure an ACL based on the user plane IP address. When the handover process is performed, the target base station may perform access control on a received packet based on the pre-configured ACL. In this case, the handover procedure is different only in that the handover request message in S701 may not carry the Xn interface user plane IP address of the source gNB, and the step of configuring the ACL by the target gNB may be performed at any moment before data forwarding, for example, before S701. This is not specifically limited in this application.

It should be understood that the NG-RAN node configuration update message may be triggered when configuration of the source gNB is updated, for example, the user plane IP address of the source gNB changes, or a neighboring cell changes. This is not limited in this application. In any scenario in which a configuration update message needs to be sent, a user plane IP address of a sender (for example, the source gNB) may be carried in the message.

In Embodiment 2, when a packet filtering function is enabled, the target gNB obtains an IP address of a data forwarding source through Xn signaling, and then automatically pre-configures the ACL. There is no need to manually configure the ACL. Therefore, data transmission reliability is improved.

Embodiment 3

In the foregoing Embodiment 1 and Embodiment 2, an example in which a handover request message is directly sent by a source base station to a target base station is used. In actual application, the handover request message may alternatively be sent by the source base station to the target base station through a core network.

Figure 8:
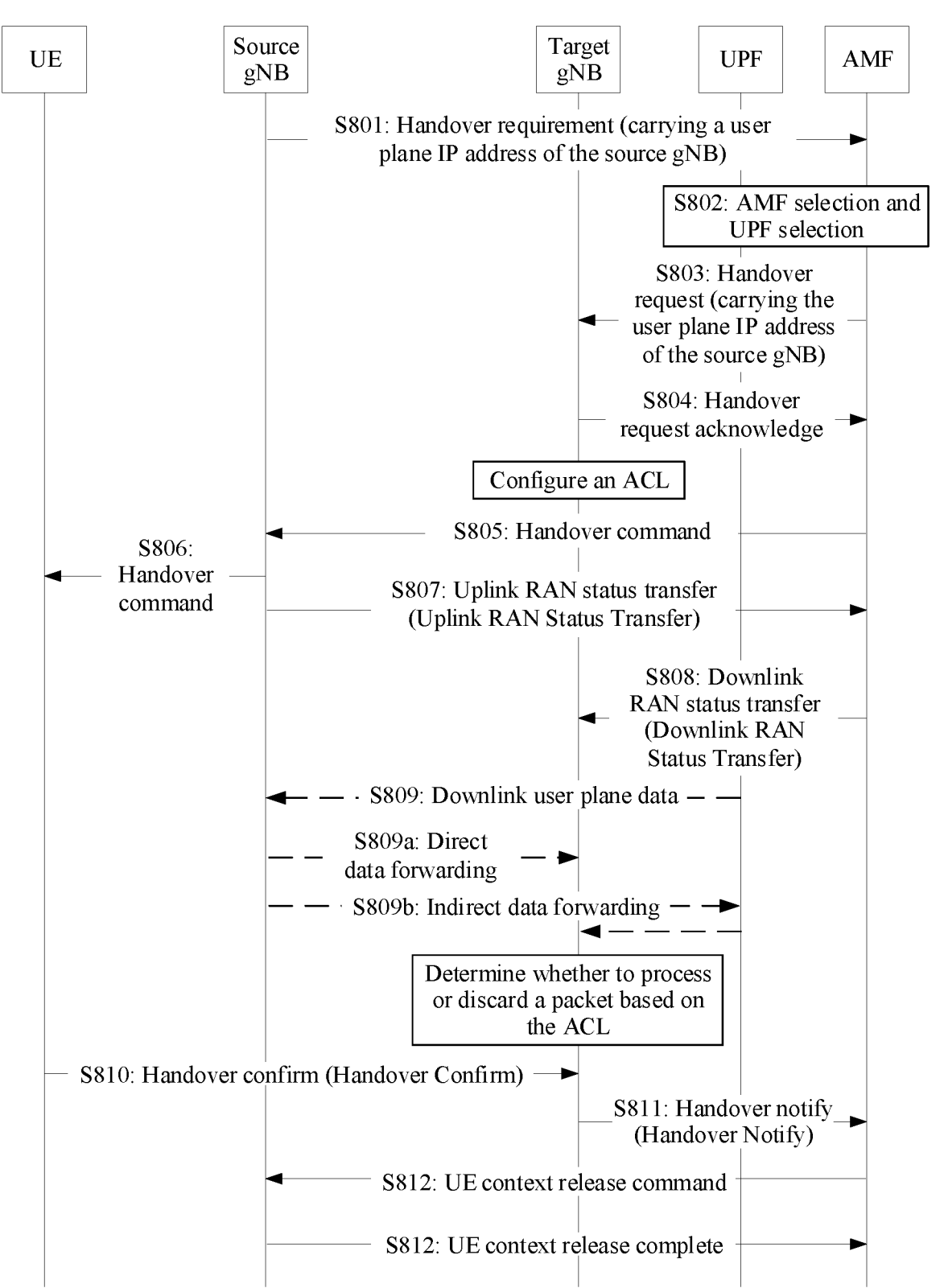
FIG. 8 is a schematic flowchart of NG-based base station handover.

As shown in FIG. 8, a scenario of NG handover is used as an example, and the following steps are specifically included.

S801: A source gNB sends a change required message to a current serving AMF. If the source gNB detects that there is a direct forwarding path between the source gNB and a target gNB, a user plane IP address of the source gNB is carried in the message.

S802: The AMF selects an AMF and a user plane function (UPF) that are used by a terminal device to perform base station handover.

S803: The AMF sends a handover request message to the target gNB, where the message carries the user plane IP address of the source gNB.

S804: The target gNB sends a handover request acknowledge message to the AMF.

It should be understood that after receiving the handover request message, the target gNB may configure an ACL based on the user plane IP address of the source gNB.

S805: The AMF sends a handover command to the source gNB.

S806: The source gNB sends a handover command to UE.

S807: The source gNB sends an uplink RAN status transfer message to the AMF.

S808: The AMF sends a downlink RAN status transfer message to the target gNB.

S809: Perform a data forwarding procedure. To be specific, the UPF sends downlink user plane data to the source gNB, and the source gNB directly forwards the data to the target gNB (that is, S809a), or the source gNB forwards the data to the target gNB through the UPF (that is, S809b).

When the source gNB directly forwards the data to the target gNB (that is, S809a), the target gNB determines, based on the ACL after receiving a packet, whether to continue to process the packet or discard the packet.

S810: The UE sends a handover confirm message to the target gNB.

S811: The target gNB sends a handover notify message to the AMF.

S812: Release a UE context. Specifically, the AMF sends a UE context release command message to the source gNB. The UE releases the context, and sends a UE context release complete message to the AMF.

It should be noted that, in Step S801, if the source gNB detects that there is no direct forwarding path between the source gNB and the target gNB, the user plane IP address of the source gNB does not need to be carried in the message. This is because data needs to be forwarded through an NG interface of the core network in indirect forwarding. The target gNB may obtain an IP address of the UPF by using an NG interface user plane setup procedure.

In Embodiment 3, when a packet filtering function is enabled, in a direct forwarding scenario of the NG handover, the target base station may obtain an IP address of a data forwarding source through NG signaling, and automatically pre-configures the ACL. There is no need to manually configure the ACL. Therefore, data transmission reliability can be improved.

FIG. 5 to FIG. 8 describe the ACL configuration solution in the X2/Xn-based inter-base-station handover scenario. The following describes an ACL configuration solution in an SN inter-base-station handover scenario in an LTE/NR dual connectivity scenario with reference to FIG. 9 and FIG. 10A and FIG. 10B.

Figure 9:
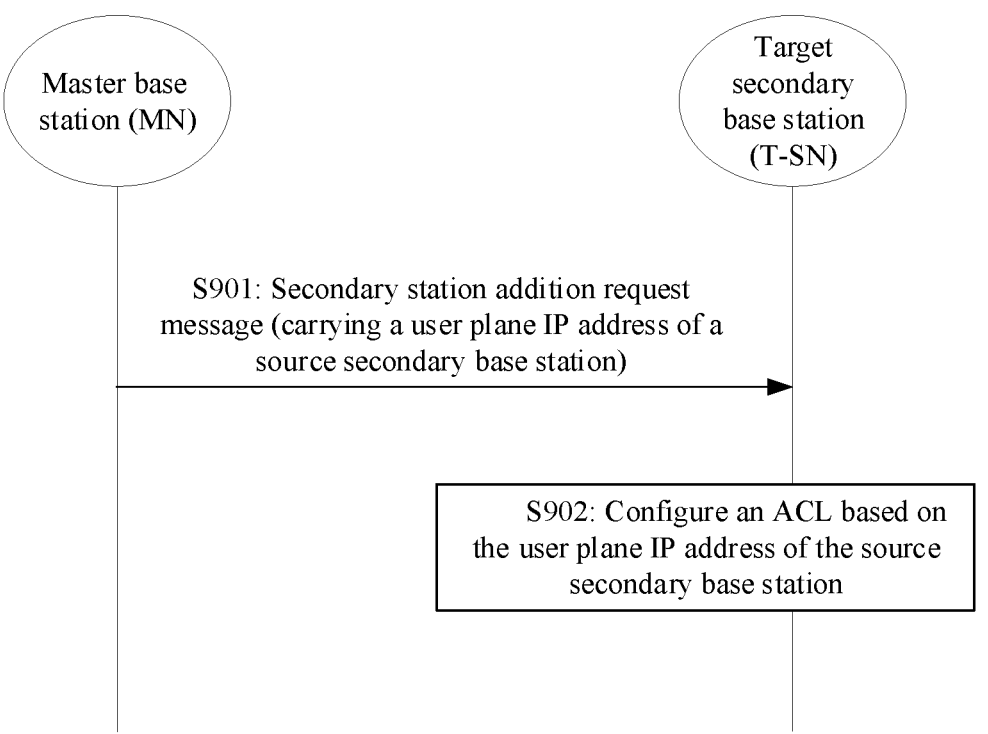
FIG. 9 is a schematic flowchart of another ACL configuration method according to an embodiment of this application.

FIG. 9 shows another ACL configuration method provided in an embodiment of this application. The method includes the following steps.

S901: A master base station (MN) sends a secondary station addition request message to a target secondary base station (T-SN), and the target secondary base station receives the secondary station addition request message from the master base station, where the secondary station addition request message carries a user plane IP address of a source secondary base station (S-SN).

In this embodiment of this application, SN inter-base-station handover may be triggered by the MN, or may be triggered by the S-SN. This is not limited in this application.

S902: The target secondary base station configures an ACL based on the user plane IP address of the source secondary base station.

Specifically, if the user plane IP address of the source secondary base station and a user plane IP address of the target secondary base station (that is, the target secondary base station) are not in the ACL of the target secondary base station, the user plane IP address of the source secondary base station and the user plane IP address of the target secondary base station are added to the ACL. The user plane IP address of the source secondary base station is used as a source IP address, and the user plane IP address of the target secondary base station is used as a destination IP address.

In this embodiment of this application, in an SN change procedure, the MN carries the user plane IP address of the S-SN in the secondary station addition request message, so that the T-SN can obtain the user plane IP address of the S-SN without performing a TNL address discovery procedure. Then, the ACL can be configured based on the obtained S-SN. Therefore, a case in which a packet sent by the S-SN is discarded by the T-SN in an SN handover scenario can be effectively avoided, and data transmission reliability can be improved.

Optionally, after the MN sends the secondary station addition request message to the T-SN, the S-SN further receives data from a core network, where the data is to be sent to a terminal device. Alternatively, the S-SN further receives data from a terminal device, where the data is to be sent to the core network. In this case, because the terminal device is handed over to the T-SN, the S-SN generates a packet based on the received data, adds a source IP address and a destination IP address to the packet, and then sends the packet to the T-SN. The source IP address is the user plane IP address of the S-SN, and the destination IP address is the user plane IP address of the T-SN. Correspondingly, after receiving the packet sent by the S-SN, the T-SN determines whether the source IP address of the packet is in the ACL. If the source IP address of the packet is in the ACL, the T-SN processes the packet. If the source IP address of the packet is not in the ACL, the T-SN discards the packet.

The user plane IP address of the S-SN has been configured in the ACL of the T-SN. Therefore, the T-SN does not discard the packet. This improves data transmission reliability.

Optionally, in Step S501, that the MN sends the secondary station addition request message to the T-SN includes but is not limited to the following two manners.

Manner 1: The S-SN and the T-SN correspond to a same MN. In this case, the MN directly generates the secondary station addition request message, and sends the secondary station addition request message to the T-SN.

For example, a coverage area of the MN is relatively large, a coverage area of the S-SN and that of the T-SN are relatively small, and the S-SN and the T-SN are in a coverage area of a same MN. In this case, the S-SN and the T-SN correspond to the same MN.

Manner 2: The S-SN and the T-SN correspond to different MNs. For example, the S-SN corresponds to a source master base station (S-MN), and the T-SN corresponds to a target master base station (T-MN). In this case, the S-MN sends a handover request message to the T-MN, and then the T-MN sends the secondary station addition request message to the T-SN.

For example, if the S-MN and the S-SN are in a same coverage area, and the T-MN and the T-SN are in a same coverage area, the S-SN and the T-SN may correspond to different MNs.

For example, the S-MN first sends the handover request message (the handover request message carries the user plane IP address of the S-SN) to the T-MN. After receiving the handover request message, the T-MN generates the secondary station addition request message, and sends the secondary station addition request message to the T-SN.

It should be noted that, in this example, a service bearer of UE is established only on the S-SN. Therefore, the handover request message and the secondary station addition request message carry only the user plane IP address of the S-SN, and only the T-SN configures the ACL. However, in actual application, the service bearer of the UE may be established on the S-SN and on the S-MN.

When the service bearer of the UE is established only on the S-MN, for an actual handover process, refer to the embodiment shown in FIG. 5. To be specific, the S-MN sends the handover request message to the T-MN, where the message carries a user plane IP address of the S-MN; and the T-MN configures an ACL based on the user plane IP address of the S-MN.

When the service bearer of the UE is established on both the S-MN and the S-MN, an actual handover process is as follows: The S-MN sends the handover request message to the T-MN, where the message carries the user plane IP address of the S-MN and the user plane IP address of the S-SN. The T-MN configures the ACL based on the user plane IP address of the S-MN. The T-MN sends the secondary station addition request message to the S-SN, where the message carries the user plane IP address of the S-SN. The T-SN configures the ACL based on the user plane IP address of the S-SN.

To better understand the technical solution shown in FIG. 9, the following further provides several complete embodiments with reference to several specific LTE/NR dual connectivity scenarios.

Embodiment 4

Figure 10A:
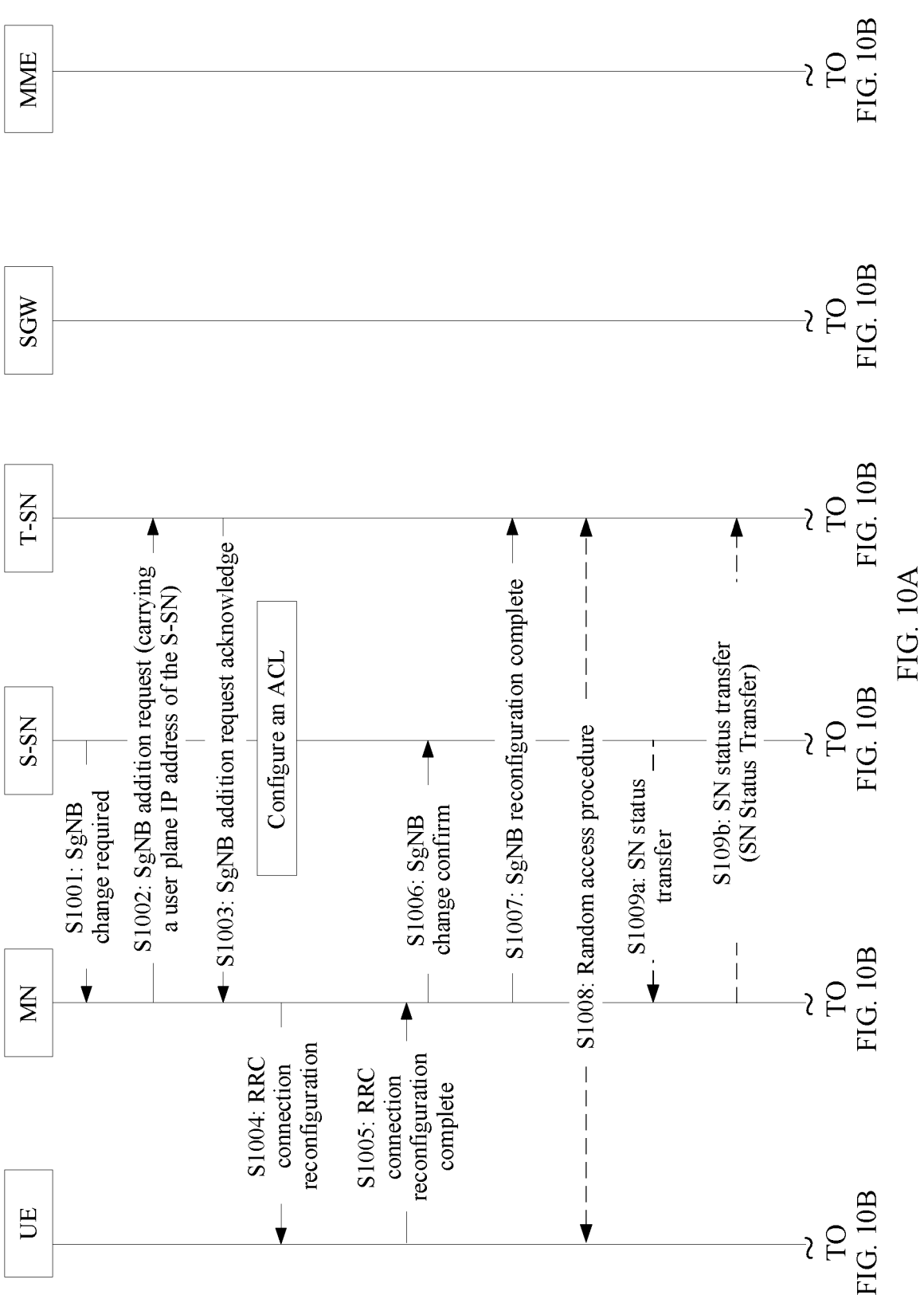
FIG. 10A and FIG. 10B are a schematic flowchart of base station handover in an SN inter-base-station handover scenario triggered by an S-SN.
Figure 10B:
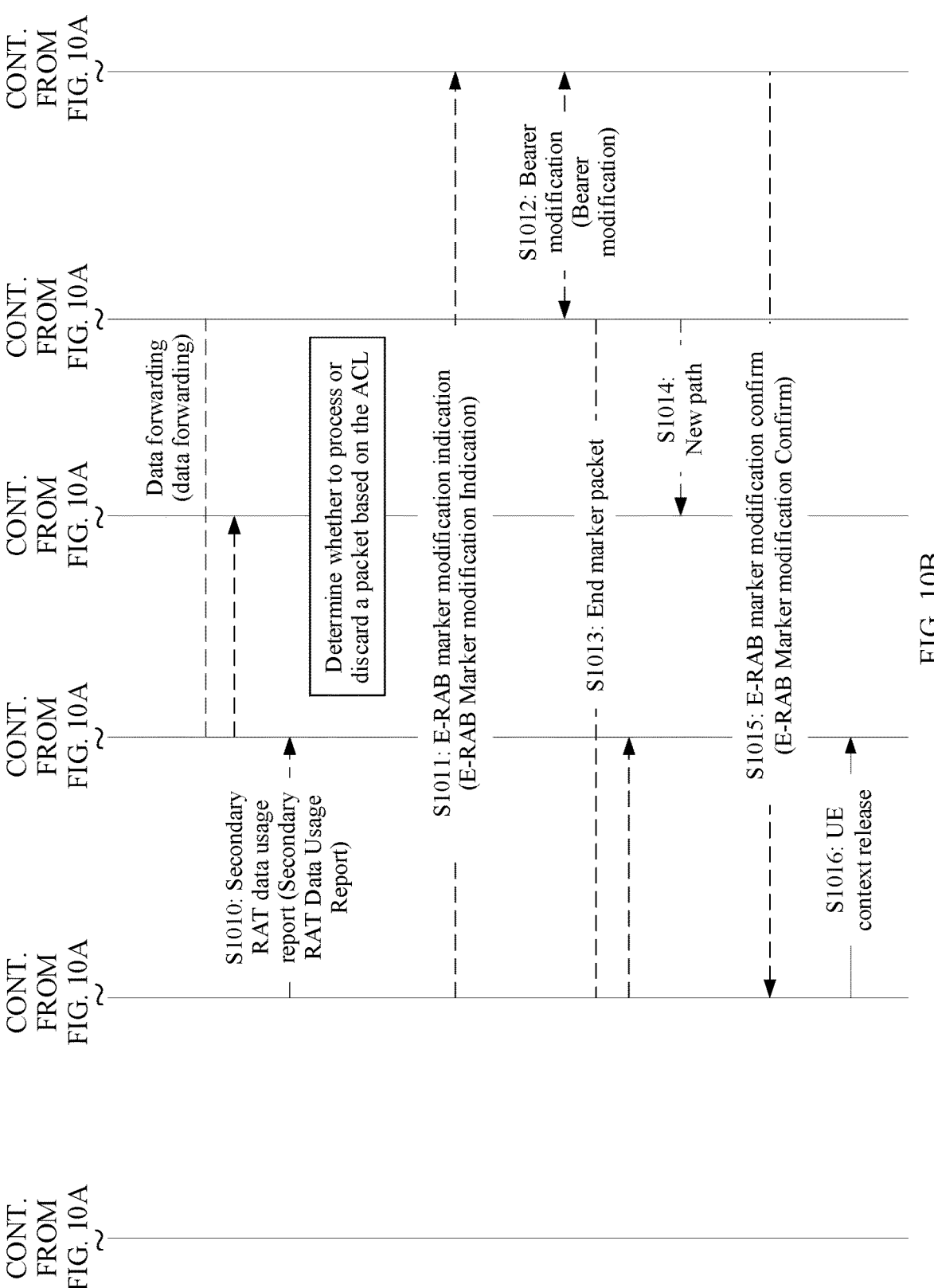

As shown in FIG. 10A and FIG. 10B, an example in which an S-SN triggers an SN inter-base-station handover procedure and the S-SN and a T-SN correspond to a same MN is used. The SN inter-base-station handover procedure includes the following steps.

S1001: The S-SN sends an SgNB change required message to the MN.

S1002: The MN sends an SgNB addition request message to the T-SN, where the message carries a user plane IP address of the S-SN.

S1003: The T-SN sends an SgNB addition request acknowledge message to the MN.

It should be understood that, after receiving the SgNB addition request message, the T-SN configures an ACL based on the user plane IP address of the S-SN.

S1004: The MN sends an RRC connection reconfiguration message to UE.

S1005: The UE sends an RRC connection reconfiguration complete message to the MN.

S1006: The MN sends an SgNB change confirm message to the S-SN.

S1007: The MN sends an SgNB reconfiguration complete message to the T-SN.

S1008: The UE initiates a random access procedure to the T-SN.

S1009: The S-SN sends an SN status transfer message to the T-SN.

S1009 includes S1009a and S1009b. S1009a: The S-SN sends an SN status transfer message to the MN. S1009b: The MN sends an SN status transfer message to the T-SN.

It should be understood that, if the T-SN receives a packet from the S-SN, the T-SN determines, based on the ACL, whether to continue to process the packet or discard the packet.

S1010: The MN sends a secondary RAT data usage report to the S-SN.

S1011: The MN sends an E-RAB marker modification indication to an SGW.

S1012: The SGW and an MME perform bearer modification on the UE.

S1013: The SGW sends an end marker packet to the S-SN via the MN.

S1014: The SGW sends a new path message to the T-SN.

S1015: The MME sends an E-RAB marker modification confirm message to the MN.

S1016: The MN indicates the S-SN to release a context of the UE.

It should be noted that before S1001, if the MN does not have user plane IP address configuration of the S-SN, the MN may initiate a secondary station change procedure triggered by the MN, to obtain the configuration of the S-SN, and then to obtain the user plane IP address of the S-SN.

In Embodiment 4, when a packet filtering function is enabled, the T-SN obtains an IP address of a data forwarding source through X2 signaling, and automatically pre-configures the ACL. There is no need to manually configure the ACL. Therefore, data transmission reliability can be improved.

Embodiment 5

Figure 11A:
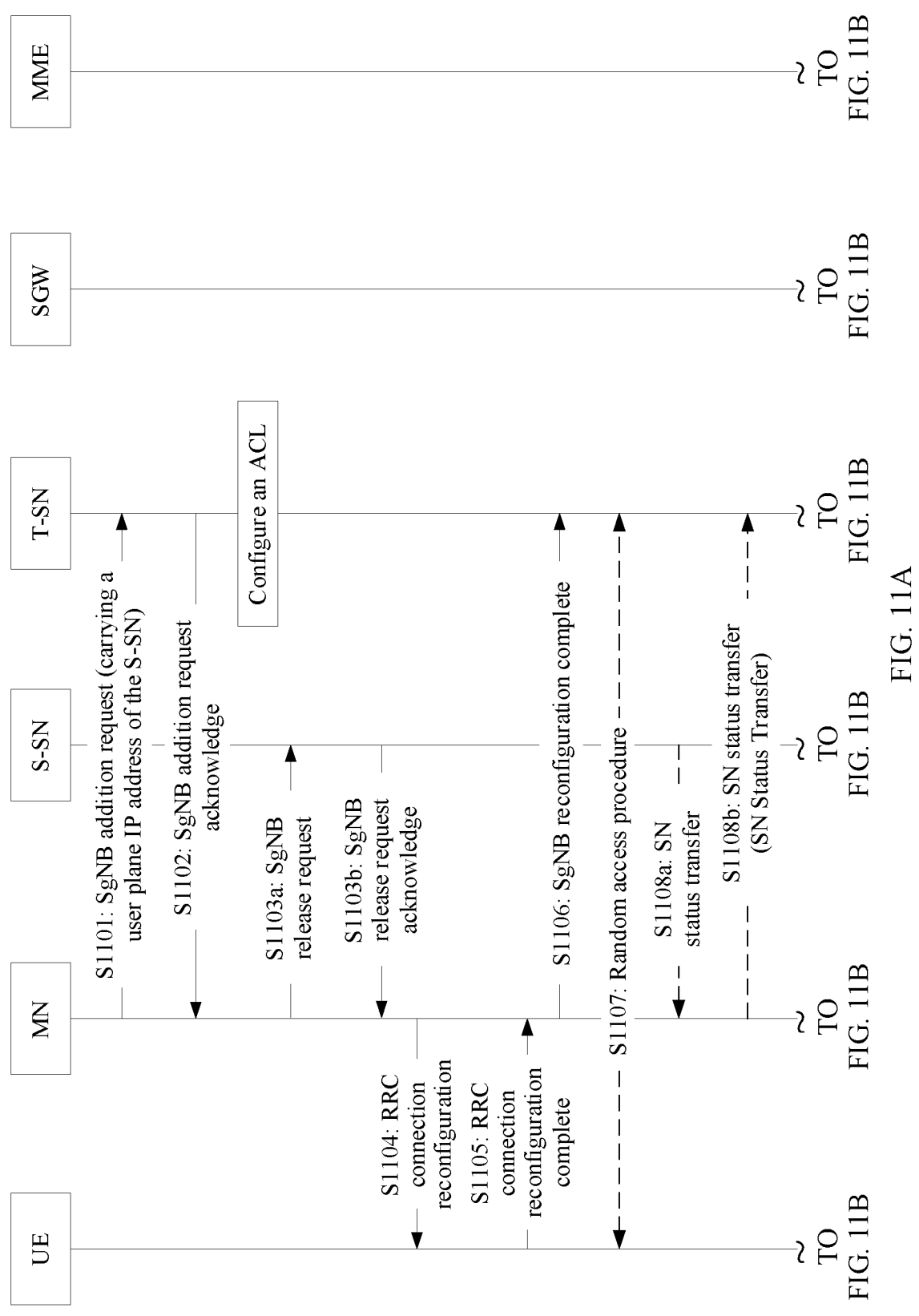
FIG. 11A and FIG. 11B are a schematic flowchart of base station handover in an SN inter-base-station handover scenario triggered by an MN.
Figure 11B:
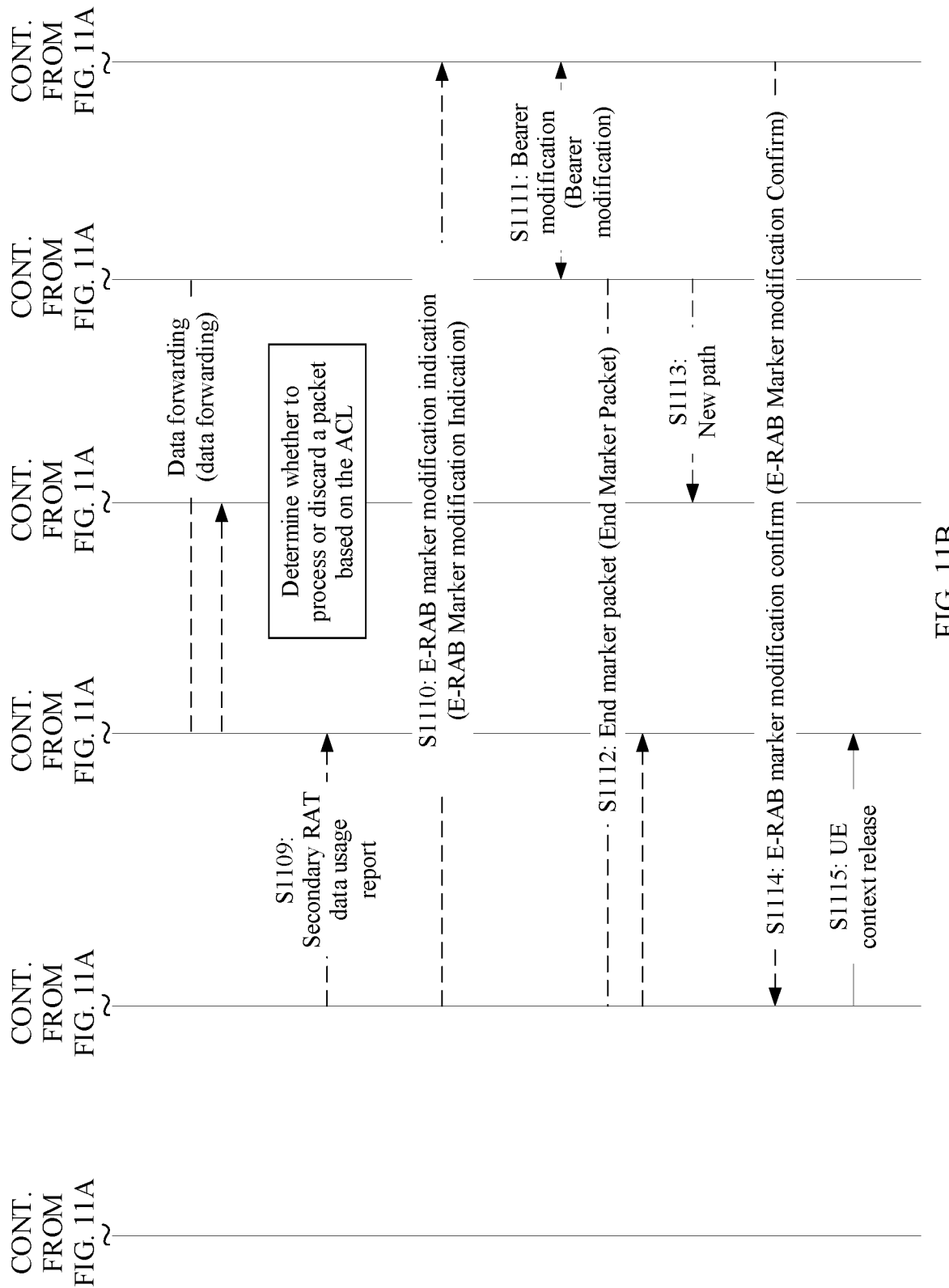

As shown in FIG. 11A and FIG. 11B, an example in which an MN triggers an SN inter-base-station handover procedure and an S-SN and a T-SN correspond to a same MN is used. The SN inter-base-station handover procedure includes the following steps.

S1101: The MN sends an SgNB addition request message to the S-SN, where the message carries a user plane IP address of the S-SN.

S1102: The T-SN sends an SgNB addition request acknowledge message to the MN.

It should be understood that, after receiving the SgNB addition request message, the T-SN may configure an ACL based on the user plane IP address of the S-SN.

S1103: The MN releases the S-SN.

S1103 includes S1103a: The MN sends an SgNB release request message to the S-SN; and S1103b: The S-SN sends an SgNB release request acknowledge message to the MN.

S1104: The MN sends an RRC connection reconfiguration message to UE.

S1105: The UE sends an RRC connection reconfiguration complete message to the MN.

S1106: The MN sends an SgNB reconfiguration complete message to the T-SN.

S1107: The UE initiates a random access procedure to the T-SN.

S1108: The S-SN sends an SN status transfer message to the T-SN.

S1108 includes S1108a: The S-SN sends an SN status transfer message to the MN; and S1108b: The MN sends an SN status transfer message to the T-SN.

It should be understood that, if the T-SN receives a packet from the S-SN, the T-SN determines, based on the ACL, whether to continue to process the packet or discard the packet.

S1109: The MN sends a secondary RAT data usage report to the S-SN.

S1110: The MN sends an E-RAB marker modification indication to an SGW.

S1111: The SGW and an MME perform bearer modification on the UE.

S1112: The SGW sends an end marker packet to the S-SN by using the MN.

S1113: The SGW sends a new path message to the T-SN.

S1114: The MME sends an E-RAB marker modification confirm message to the MN.

S1115: The MN indicates the S-SN to release a context of the UE.

It should be noted that before S1101, if the MN has no user plane IP address configuration of the S-SN, the MN may initiate a secondary station change procedure triggered by the MN to obtain configuration of the S-SN, and then to obtain the user plane IP address of the S-SN.

In Embodiment 5, the T-SN obtains an IP address of a data forwarding source through X2 signaling, and automatically pre-configures the ACL. There is no need to manually configure the ACL. Therefore, data transmission reliability can be improved.

Embodiment 6

Figure 12A:
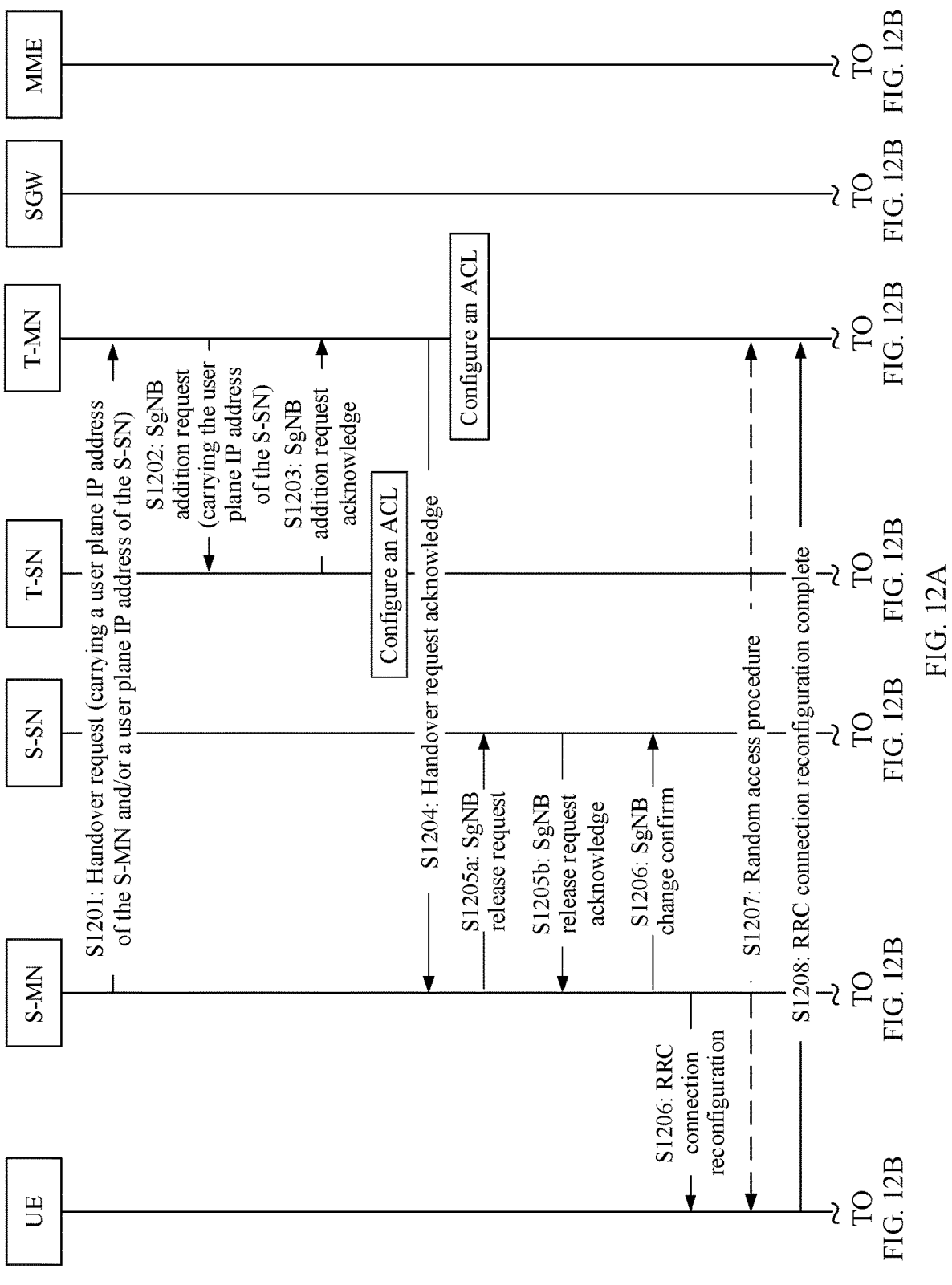
FIG. 12A and FIG. 12B are a schematic flowchart of base station handover in a scenario in which MN inter-base-station handover and SN inter-base-station handover are simultaneously performed.
Figure 12B:
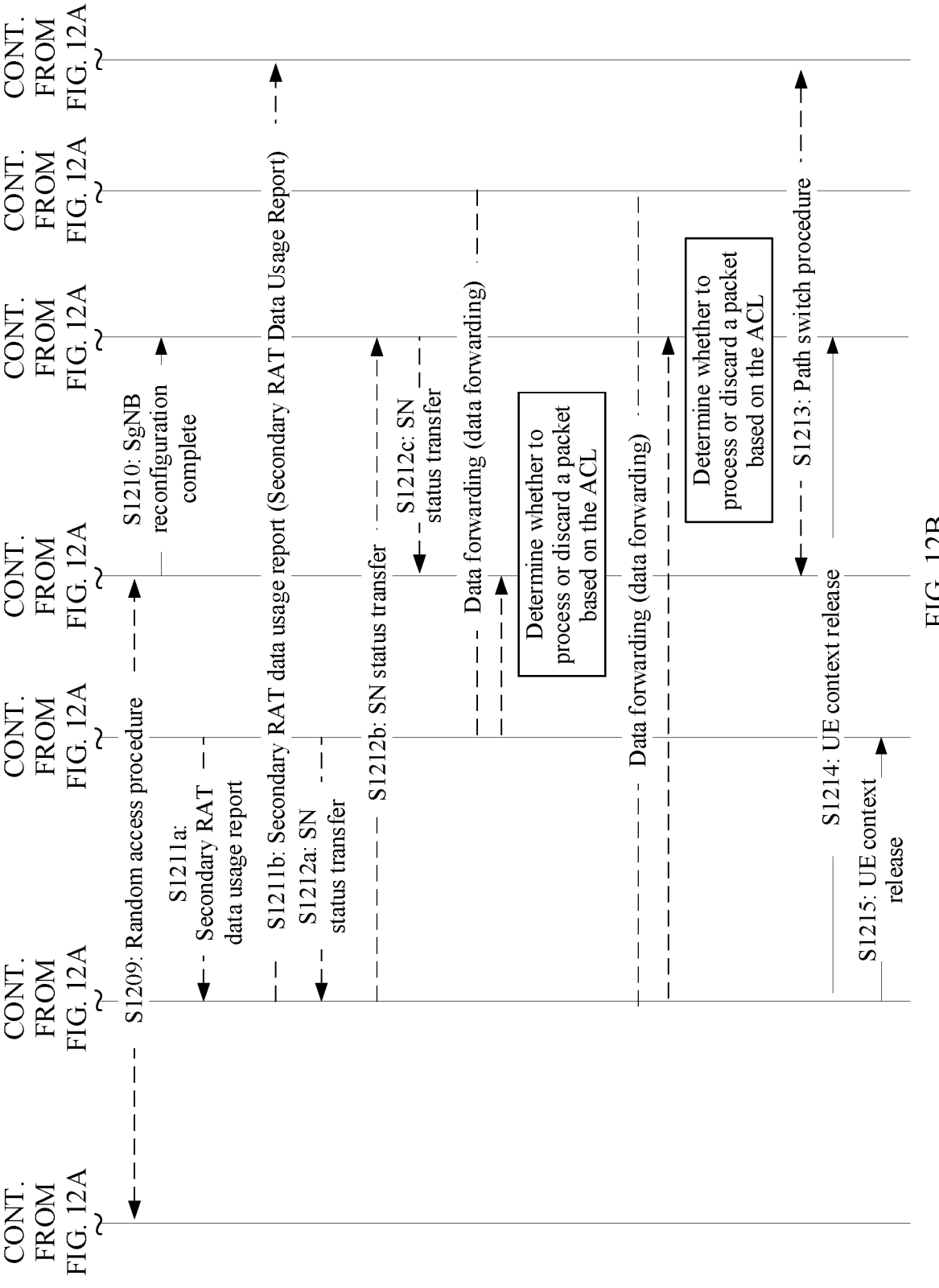

As shown in FIG. 12A and FIG. 12B, a procedure in which MN inter-base-station handover and SN inter-base-station handover are simultaneously performed is used as an example. The handover procedure includes the following steps.

S1201: An S-MN sends a handover request message to a T-MN, where the message carries a user plane IP address of an S-SN and/or a user plane IP address of the S-MN.

A bearer of a dual connectivity service carries an address of the S-SN, and a bearer of a non-dual connectivity service carries an address of the S-MN.

The T-MN may configure an ACL based on the user plane IP address of the S-MN in the handover request message and an IP address of the T-MN.

S1202: The T-MN sends an SgNB addition request message to a T-SN, where the message carries the user plane IP address of the S-SN.

A source user plane IP address of data forwarding carried in a dual connectivity bearer for handover to the T-SN is obtained from the handover request message.

The T-SN may configure an ACL based on the user plane IP address in the SgNB addition request message and the IP address of the T-SN.

S1203: The T-SN sends an SgNB addition request acknowledge message to the T-MN.

S1204: The T-MN sends a handover request acknowledge message to the S-MN

S1205: The S-MN releases the S-SN.

S1205 includes S1205*a*: The S-MN sends an SgNB release request message to the S-SN; and S1205*b*: The S-SN sends an SgNB release request acknowledge message to the S-MN.

S1206: The S-MN sends an RRC connection reconfiguration message to UE, and the S-MN sends an SgNB change confirm message to the S-SN.

S1207: The UE initiates a random access procedure to the T-MN.

S1208: The UE sends an RRC connection reconfiguration complete message to the T-SN.

S1209: The UE initiates a random access procedure to the T-SN.

S1210: The T-SN sends an SgNB reconfiguration complete message to the T-MN.

S1211: The S-SN sends a secondary RAT data usage report to the S-MN by using the S-MN (including S1211*a* and S1211*b*).

S1212: Send SN status transfer messages.

Specifically, the following steps are included: S1212*a*: The S-SN sends an SN status transfer message to the S-MN; S1212*b*: The S-MN sends an SN status transfer message to the T-MN; and S1212*c*: The T-MN sends an SN status transfer message to the T-SN.

It should be understood that, if the T-SN receives a packet from the S-SN, the T-SN determines, based on the ACL configured on the T-SN, whether to continue to process the packet or discard the packet. If the T-MN receives a packet from the S-MN, the T-MN determines, based on the ACL configured on the T-MN, whether to continue to process the packet or discard the packet.

S1213: An MME and the T-SN perform a path switch procedure.

S1214: The S-MN indicates the T-MN to release a context of the UE.

S1215: The S-MN indicates the S-SN to release the context of the UE.

It should be noted that before S1101, if the MN has no user plane IP address configuration of the S-SN, the MN may initiate a secondary station change procedure triggered by the MN to obtain configuration of the S-SN, and then to obtain the user plane IP address of the S-SN.

In Embodiment 6, the T-SN and the T-MN obtain an IP address of a data forwarding source through X2 signaling, and automatically pre-configure the ACL. There is no need to manually configure the ACL. Therefore, data transmission reliability can be improved.

Embodiment 7

Figure 13A:
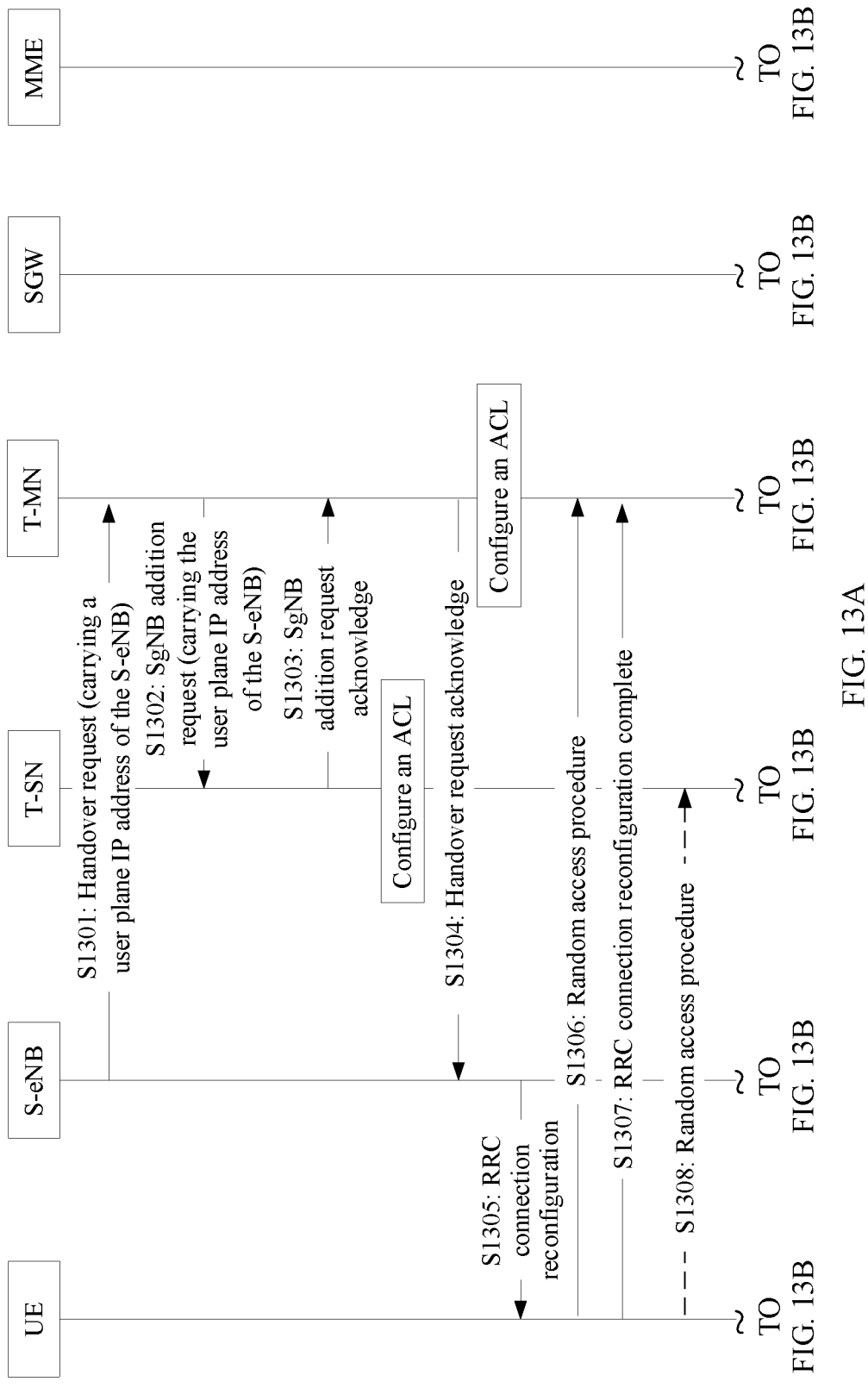
FIG. 13A and FIG. 13B are a schematic flowchart of base station handover in a scenario in which an eNodeB/gNodeB changes to a master station.
Figure 13B:
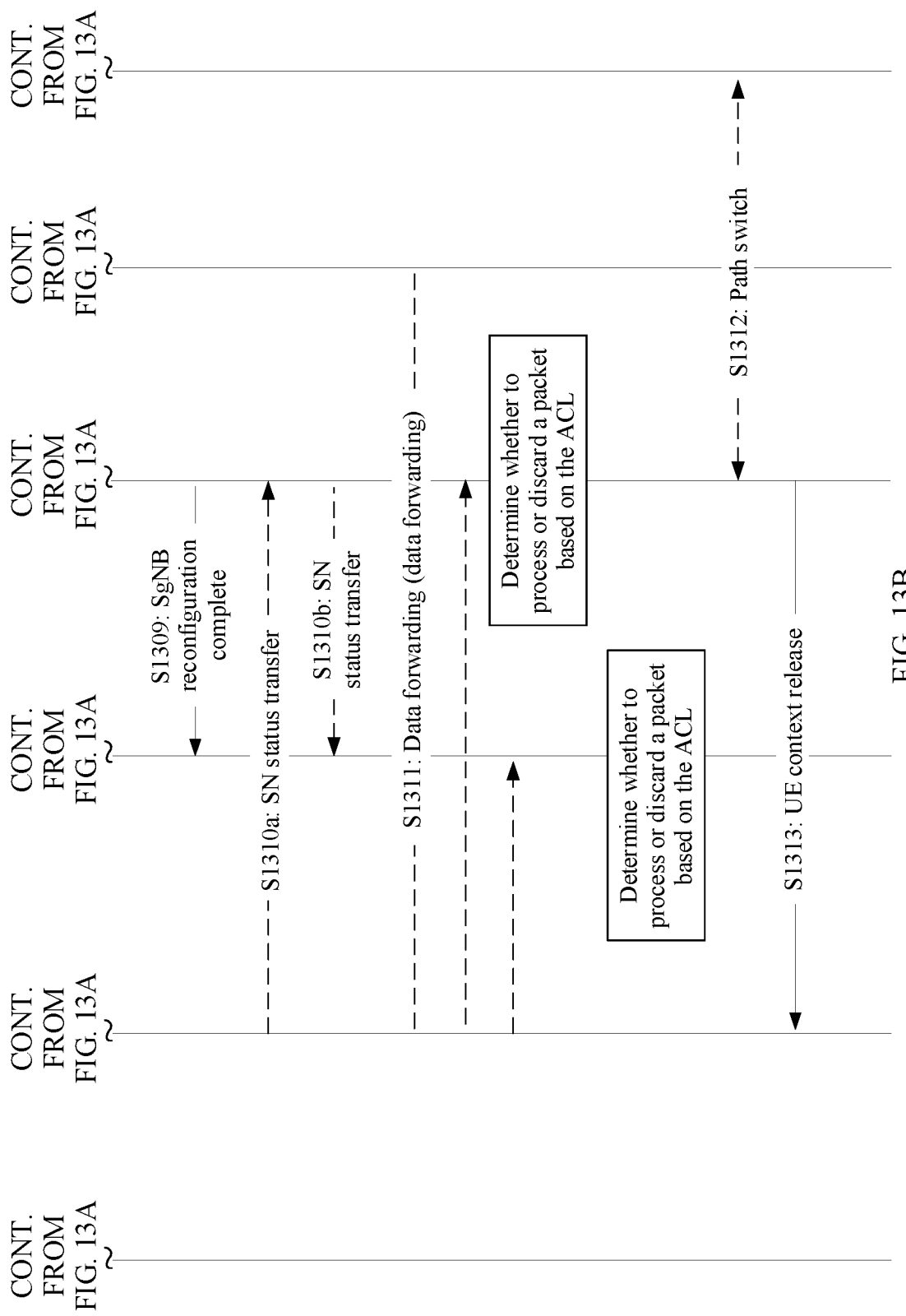

As shown in FIG. 13A and FIG. 13B, an example of a scenario in which an eNodeB/gNodeB changes to a master station is used. A handover procedure includes the following steps.

S1301: A source base station S-eNB sends a handover request message to a T-MN, where the message carries a user plane IP address of an S-SN and/or an S-eNB.

The T-MN may configure an ACL based on the user plane IP address of the S-eNB in the handover request message and an IP address of the T-MN.

S1302: The T-MN sends an SgNB addition request message to a T-SN, where the message carries the user plane IP address of the S-eNB.

A source IP address of data forwarding of a dual-connectivity bearer is obtained from the handover request message.

The T-SN may configure an ACL based on the user plane IP address of the S-eNB in the SgNB addition request message and the IP address of the T-SN.

S1303: The T-SN sends an SgNB addition request acknowledge message to the T-MN.

S1304: The T-MN sends a handover request acknowledge message to the S-eNB.

S1305: The S-eNB sends an RRC connection reconfiguration message to UE.

S1306: The UE initiates a random access procedure to the T-MN.

S1307: The UE sends an RRC connection reconfiguration complete message to the T-SN.

S1308: The UE initiates a random access procedure to the T-SN.

S1309: The T-MN sends an SgNB reconfiguration complete message to the T-SN.

S1310: Send SN status transfer messages.

S1310 includes S1310*a*: The S-eNB sends an SN status transfer message to the T-MN; and S1312*b*: The T-MN sends an SN status transfer message to the T-SN.

S1311: Perform data forwarding.

If the T-SN receives a packet from the S-eNB, the T-SN determines, based on the ACL configured on the T-SN, whether to continue to process the packet or discard the packet. If the T-MN receives a packet from the S-eNB, the T-MN determines, based on the ACL configured on the T-MN, whether to continue to process the packet or discard the packet.

S1312: The T-MN and an MME perform a path switch procedure.

S1313: The T-MN indicates the S-eNB to release a context of the UE.

In Embodiment 7, when a packet filtering function is enabled, in a scenario in which an eNodeB/gNodeB changes to a master station, the T-MN and the T-SN obtain an IP address of a data forwarding source through X2 signaling, and automatically pre-configure the ACL. There is no need to manually configure the ACL. Therefore, data transmission reliability is improved.

Embodiment 8

Figure 14A:
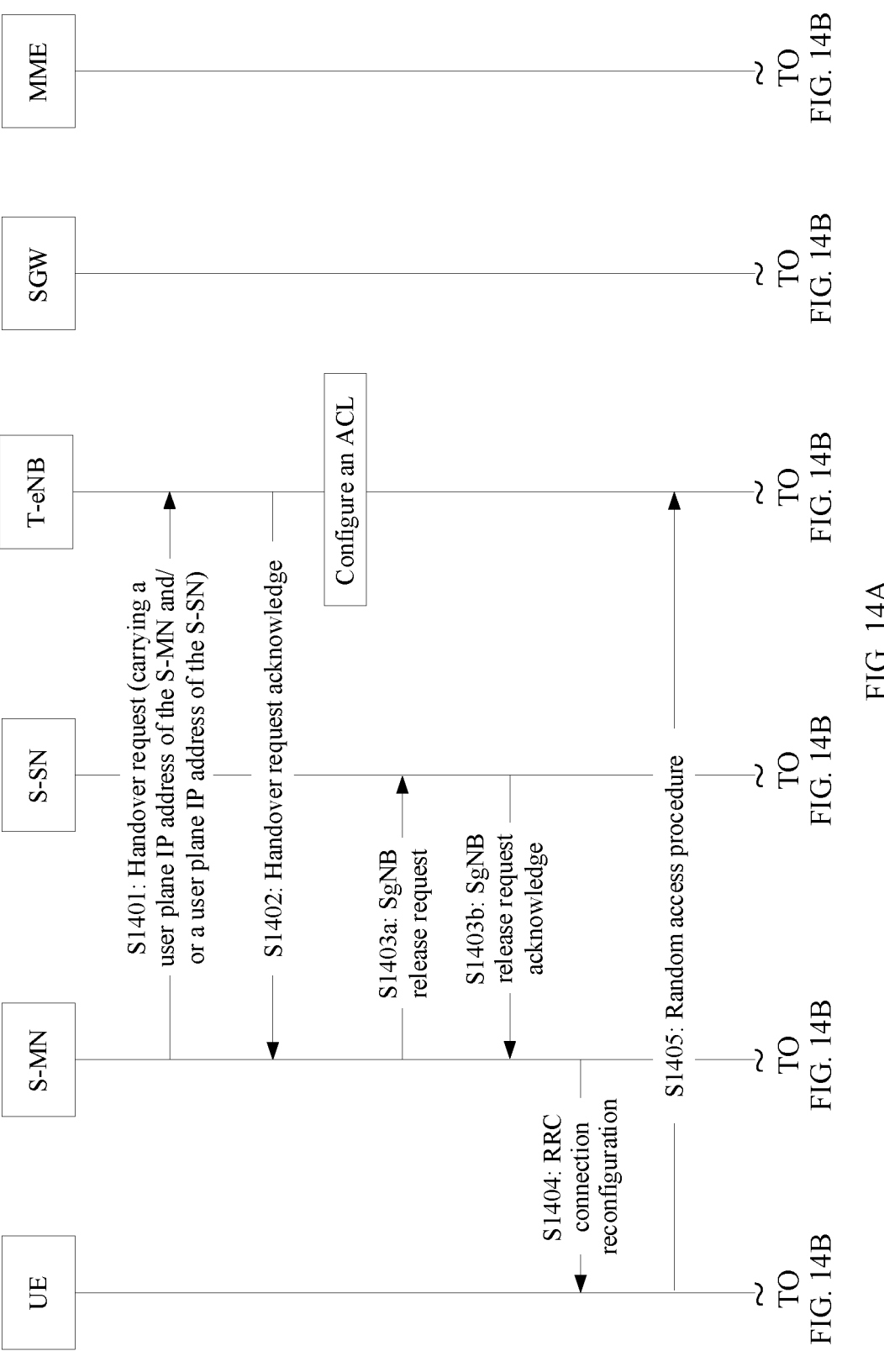
FIG. 14A and FIG. 14B are a schematic flowchart of base station handover in a scenario in which a master station changes to an eNodeB/gNodeB.
Figure 14B:
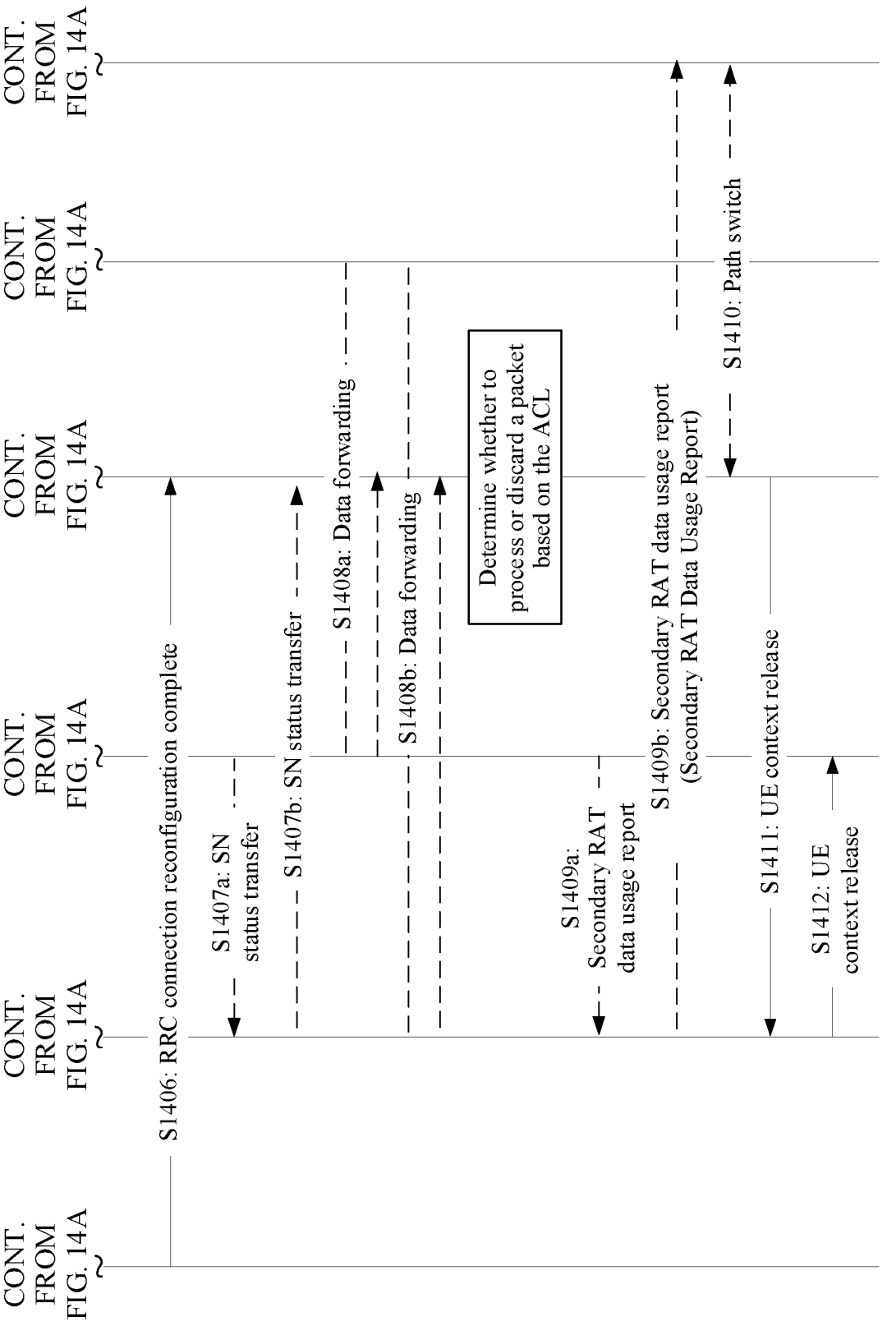

As shown in FIG. 14A and FIG. 14B, the following figure is used as an example of a scenario in which a master station changes to an eNodeB/gNodeB. A handover procedure includes the following steps.

S1401: An S-MN sends a handover request message to a target base station T-eNB, where the message carries a user plane IP address of an S-SN and/or a user plane IP address of the S-MN.

A bearer of a dual connectivity service carries an address of the S-SN, and a bearer of a non-dual connectivity service carries an address of the S-MN.

The T-eNB may configure an ACL based on the user plane IP address of the S-SN and/or the S-MN in the handover request message and an IP address of the T-eNB.

S1402: The T-eNB sends a handover request acknowledge message to a T-MN.

S1403: The S-MN releases the S-SN.

S1403 includes S1403*a*: The S-MN sends an SgNB release request message to the S-SN; and S1403*b*: The S-SN sends an SgNB release request acknowledge message to the S-MN.

S1404: The S-MN sends an RRC connection reconfiguration message to UE.

S1405: The UE initiates a random access procedure to the T-eNB.

S1406: The UE sends an RRC connection reconfiguration complete message to the T-eNB.

S1407: Send SN status transfer messages.

Specifically, the following steps are included: S1407a: The S-SN sends an SN status transfer message to the S-MN; and S1407b: The S-MN sends an SN status transfer message to the T-eNB.

S1408: Perform data forwarding.

It should be understood that, if the T-eNB receives a packet from the S-SN, the T-eNB determines, based on the ACL configured on the T-eNB, whether to continue to process the packet or discard the packet. If the T-eNB receives a packet from the S-MN, the T-eNB determines, based on the ACL configured on the T-eNB, whether to continue to process the packet or discard the packet.

S1409: The S-SN sends a secondary RAT data usage report to an MME by using the S-MN (including S1409a and S1409b).

S1410: The T-eNB and the MME perform a path switch procedure.

S1411: The T-eNB indicates the T-MN to release a context of the UE.

S1412: The T-MN indicates the S-SN to release the context of the UE.

In Embodiment 8, when a packet filtering function is enabled, in a scenario in which a master station changes to an eNodeB/gNodeB, the T-eNB obtains an IP address of a data forwarding source through X2 signaling, and automatically pre-configures the ACL. There is no need to manually configure the ACL. Therefore, data transmission reliability can be improved.

It should be understood that embodiments in this specification may be mutually combined to achieve different technical effects.

The foregoing describes various methods provided in embodiments of this application, and the following describes an apparatus provided in embodiments of this application.

Based on a same technical concept, an embodiment of this application further provides an ACL configuration apparatus. The apparatus may be, for example, a base station or a chip disposed inside a base station. The apparatus has a function implemented by any base station in FIG. 5 to FIG. 14A and FIG. 14B. For example, the apparatus 800 includes a corresponding module, unit, or means for performing the steps performed by any base station in the embodiments shown in FIG. 5 to FIG. 14A and FIG. 14B. The function, unit, or means may be implemented by software, or may be implemented by hardware, or may be implemented by hardware executing corresponding software.

Figure 15:
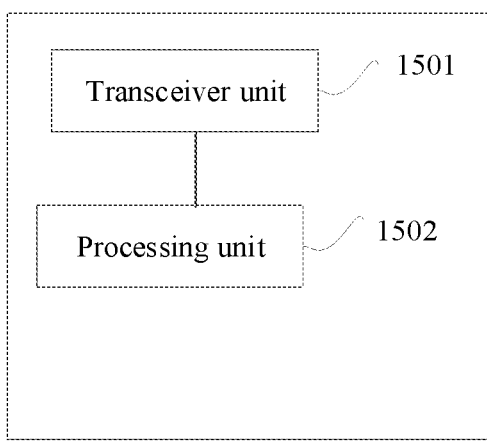
FIG. 15 is a schematic diagram of a structure of an ACL configuration apparatus according to this application.

For example, as shown in FIG. 15, the apparatus includes a transceiver unit 1501 and a processing unit 1502.

When the apparatus is located in the second base station shown in FIG. 5, functions of modules of the apparatus are as follows:

The transceiver unit 1501 is configured to receive a handover request message or a configuration update message from a first base station, where the handover request message or the configuration update message carries a user plane IP address of the first base station.

The processing unit 1502 is configured to configure an ACL based on the user plane IP address.

Optionally, the transceiver unit 1501 is further configured to receive a packet from the first base station after the processing unit 1502 configures the ACL based on the user plane IP address. The processing unit 1502 is further configured to determine whether a source IP address of the packet is in the ACL. If the source IP address of the packet is in the ACL, the processing unit 1502 processes the packet. If the source IP address of the packet is not in the ACL, the processing unit 1502 discards the packet.

Optionally, when receiving the handover request message from the first base station, the transceiver unit 1501 is specifically configured to receive the handover request message from the first base station via a core network element.

When the apparatus is located in the first base station shown in FIG. 5, functions of modules of the apparatus are as follows:

A processing unit 1502 is configured to generate a handover request message or a configuration update message, where the handover request message or the configuration update message carries a user plane IP address of the first base station. A transceiver unit 1501 is configured to send the handover request message or the configuration update message to a second base station.

Optionally, the transceiver unit 1501 is specifically configured to send the handover request message to the second base station via a core network element.

Optionally, the transceiver unit 1501 is further configured to receive data from a core network, or receive data from a terminal device after sending the handover request message or the configuration update message to the second base station. The processing unit 1502 is further configured to generate a packet based on the data. The transceiver unit 1501 is further configured to send a packet to the second base station, the packet carries a source IP address, and the source IP address is the user plane IP address of the first base station.

Optionally, the packet is sent through an interface between the first base station and the second base station.

When the apparatus is located in the target secondary base station shown in FIG. 9, functions of modules of the apparatus are as follows:

A transceiver unit 1501 is configured to receive a secondary station addition request message from a master base station, where the secondary station addition request message carries a user plane IP address of a source secondary base station.

A processing unit 1502 is configured to configure an ACL based on the user plane IP address.

Optionally, the transceiver unit 1501 is further configured to receive a packet from the source secondary base station after the processing unit 1502 configures the ACL based on the user plane IP address. The processing unit 1502 is further configured to determine whether a source IP address of the packet is in the ACL. If the source IP address of the packet is in the ACL, the processing unit 1502 processes the packet. If the source IP address of the packet is not in the ACL, the processing unit 1502 discards the packet.

Optionally, the source secondary base station and the target secondary base station correspond to different master base stations. For example, the master base station is a target master base station, and the source secondary base station corresponds to a source master base station. When receiving the secondary station addition request message from the master base station, the transceiver unit 1501 is specifically configured to receive the secondary station addition request message from the target master base station.

Optionally, both the target secondary base station and the source secondary base station correspond to the master base station, that is, the target secondary base station and the source secondary base station correspond to a same master base station.

When the apparatus is located in the master base station shown in FIG. 9, functions of modules of the apparatus are as follows:

A processing unit 1502 is configured to generate a secondary station addition request message, where the secondary station addition request message carries a user plane IP address of a source secondary base station.

A transceiver unit 1501 is configured to send the secondary station addition request message to a target secondary base station.

Optionally, the source secondary base station and the target secondary base station correspond to different master base stations. For example, the source secondary base station corresponds to a source master base station, and the target secondary base station corresponds to a target master base station. The processing unit 1502 is further configured to receive a handover request message from the source master base station before generating the secondary station addition request message, and the handover request message carries the user plane IP address of the source secondary base station.

Optionally, the handover request message further carries a user plane IP address of the source master base station, and the processing unit 1502 is further configured to configure an ACL based on the user plane IP address of the source master base station.

Optionally, the target secondary base station and the source secondary base station correspond to the master base station, that is, the target secondary base station and the source secondary base station correspond to a same master base station.

Figure 16:
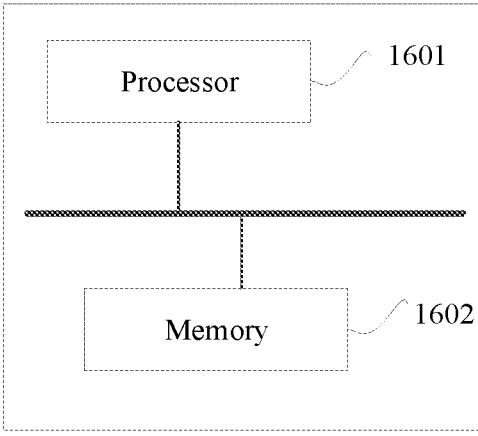
FIG. 16 is a schematic diagram of a structure of a communications apparatus according to this application.

Based on a same technical concept, an embodiment of this application further provides a communications apparatus. As shown in FIG. 16, the apparatus includes a processor 1601 and a memory 1602. The memory 1602 is configured to store computer-executable instructions. The processor 1601 is configured to execute the computer-executable instructions stored in the memory 1602, so that the communications apparatus performs the method performed by any base station in the embodiments shown in FIG. 5 to FIG. 14A and FIG. 14B.

The processor 1601 and the memory 1602 may be coupled by using an interface circuit, or may be integrated together. This is not limited herein.

In this embodiment of this application, a specific connection medium between the processor 1601 and the memory 1602 is not limited. In this embodiment of this application, the processor 1601 and the memory 1602 are connected through a bus in FIG. 16, and the bus is represented by a bold line in FIG. 16. A connection manner between other components is only schematically described, and is not limited thereto. The bus may be classified into an address bus, a data bus, a control bus, and the like. For ease of representation, only one bold line is for representing the bus in FIG. 16, but this does not mean that there is only one bus or only one type of bus.

It should be understood that the processor mentioned in embodiments of this application may be implemented by hardware or may be implemented by software. When the processor is implemented by the hardware, the processor may be a logic circuit, an integrated circuit, or the like. When the processor is implemented by the software, the processor may be a general-purpose processor, and is implemented by reading software code stored in the memory.

For example, the processor may be a central processing unit (CPU), or may be another general-purpose processor, a digital signal processor (DSP), an application-specific integrated circuit (ASIC), a field programmable gate array (FPGA), another programmable logic device, a discrete gate, a transistor logic device, a discrete hardware component, or the like. The general-purpose processor may be a microprocessor, or the processor may be any conventional processor or the like.

It may be understood that the memory mentioned in embodiments of this application may be a volatile memory or a nonvolatile memory, or may include a volatile memory and a nonvolatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM) or a flash memory. The volatile memory may be a random access memory (RAM), and is used as an external cache. By way of example, and not limitation, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchronous Link DRAM, SLDRAM), and a direct Rambus random access memory (Direct Rambus RAM, DR RAM).

It should be noted that when the processor is a general-purpose processor, a DSP, an ASIC, an FPGA or another programmable logic device, a discrete gate or a transistor logic device, or a discrete hardware component, the memory (storage module) may be integrated into the processor.

It should be noted that the memory described in this specification aims to include but is not limited to these memories and any memory of another proper type.

Figure 17:
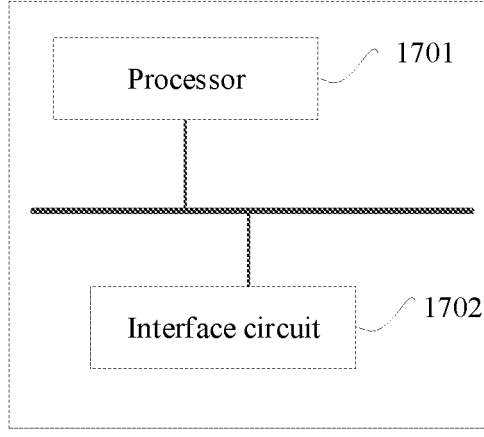
FIG. 17 is a schematic diagram of a structure of another communications apparatus according to this application.

Based on a same technical concept, an embodiment of this application further provides a communications apparatus. As shown in FIG. 17, the apparatus includes a processor 1701 and an interface circuit 1702. The interface circuit 1702 is configured to receive a code instruction and transmit the code instruction to the processor 1701. The processor 1701 runs the code instruction to perform the method performed by any base station in the embodiments shown in FIG. 5 to FIG. 14A and FIG. 14B.

Based on a same technical concept, an embodiment of this application further provides a computer-readable storage medium. The computer-readable storage medium is configured to store instructions. When the instructions are executed, the method performed by any base station in the embodiments shown in FIG. 5 to FIG. 14A and FIG. 14B is implemented.

Based on a same technical concept, an embodiment of this application further provides a chip. The chip is coupled to a memory, and is configured to read and execute program instructions stored in the memory, to implement the method performed by any base station in the embodiments shown in FIG. 5 to FIG. 14A and FIG. 14B.

Based on a same technical concept, an embodiment of this application further provides a computer program product including instructions. The computer program product stores the instructions, and when the instructions are run on a computer, the computer is enabled to perform the method performed by any base station in the embodiments shown in FIG. 5 to FIG. 14A and FIG. 14B.

A person skilled in the art should understand that the embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product implemented on one or more computer-usable storage media (including but not limited to a disk memory, a CD-ROM, an optical memory, and the like) that include computer-usable program code.

This application is described with reference to the flowcharts and/or the block diagrams of the method, the device (system), and the computer program product according to this application. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate an apparatus for implementing a specific function in one or more processes in the flowcharts and/or in one or more blocks in the block diagrams.

These computer program instructions can be stored in a computer-readable memory that can instruct the computer or the another programmable data processing device to work in a specific way, so the instructions stored in the computer-readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of protection defined by the claims of this application and their equivalent technologies.

What is claimed is:

1. An access control list (ACL) configuration apparatus, the apparatus comprising:
a transceiver, configured to receive a handover request message or a configuration update message from a first base station, wherein the handover request message or the configuration update message carries a user plane Internet Protocol (IP) address of the first base station; and
a processor, configured to configure an ACL based on the user plane IP address of the first base station, wherein the ACL is used to filter packages based on user plane IP addresses in the ACL;

wherein the transceiver is further configured to receive a packet from the first base station after the processor configures the ACL based on the user plane IP address of the first base station; and
wherein the processor is further configured to determine whether a source IP address of the packet is in the ACL, wherein based on the source IP address of the packet being in the ACL, the processor processes the packet, or based on the source IP address of the packet not being in the ACL, the processor discards the packet.

2. The apparatus according to claim 1, wherein the packet is sent through an interface between the first base station and the transceiver of the apparatus.

3. The apparatus according to claim 1, wherein the source IP address of the packet is the user plane IP address of the first base station.

4. The apparatus according to claim 1, wherein the transceiver is configured to receive the handover request message from the first base station via a core network element.

5. A target secondary base station, comprising:
a transceiver, configured to receive a secondary station addition request message from a target master base station, wherein the secondary station addition request message carries a user plane Internet Protocol (IP) address of a source secondary base station; and
a processor, configured to configure an access control list (ACL) based on the user plane IP address of the source secondary base station, wherein the ACL is used to filter packages based on user plane IP addresses in the ACL;
wherein the transceiver is further configured to receive a packet from the source secondary base station after the processor configures the ACL based on the user plane IP address of the source secondary base station; and
wherein the processor is further configured to determine whether a source IP address of the packet is in the ACL, wherein based on the source IP address of the packet being in the ACL, the processor processes the packet, or based on the source IP address of the packet not being in the ACL, the processor discards the packet.

6. The target secondary base station according to claim 5, wherein the source secondary base station corresponds to a source master base station, and the target secondary base station corresponds to the target master base station.

7. The target secondary base station according to claim 5, wherein the target secondary base station and the source secondary base station correspond to the target master base station.

8. The target secondary base station according to claim 5, wherein the source secondary base station corresponds to a source master base station, and the target secondary base station corresponds to the target master base station; and
wherein the target master base station is configured to receive a handover request message from the source master base station before the target master base station generates the secondary station addition message, wherein the handover request message carries the user plane IP address of the source secondary base station.

9. The target secondary base station according to claim 8, wherein the handover request message further carries a user plane IP address of the source master base station; and
wherein the processor is further configured to configure the ACL based on the user plane IP address of the source master base station.

10. A communications system, comprising:

a first base station; and a second base station;

wherein the first base station is configured to:

generate a handover request message or a configuration update message, wherein the handover request message or the configuration update message carries a user plane IP address of the first base station; and send the handover request message or the configuration update message to the second base station;

wherein the second base station is configured to:

receive the handover request message or the configuration update message from the first base station;

configure an access control list (ACL) based on the user plane IP address of the first base station, wherein the ACL is used to filter packages based on user plane IP addresses in the ACL;

after configuring the ACL based on the user plane IP address of the first base station, receive a packet from the first base station;

determine whether a source IP address of the packet is in the ACL; and based on the source IP address of the packet being in the ACL, process the packet, or based on the source IP address of the packet not being in the ACL, discard the packet.

11. The communications system according to claim 10, wherein the second base station is configured to receive the handover request message from the first base station via a core network element.

12. The communications system according to claim 10, wherein after the sending the handover request message or the configuration update message to the second base station, the first base station is further configured to:

receive data from a core network or a terminal device;

generate a packet based on the data; and send the packet to the second base station, wherein the packet carries a source IP address, and the source IP address is the user plane IP address of the first base station.

13. The communications system according to claim 12, wherein the packet is sent through an interface between the first base station and the second base station.

* * * * *